US011310023B2

(12) United States Patent
Manolakos et al.

(10) Patent No.: US 11,310,023 B2
(45) Date of Patent: Apr. 19, 2022

(54) NON-UNIFORM DEMODULATION REFERENCE SIGNAL BUNDLING

(71) Applicant: QUALCOMM Incorporated, San Diego, CA (US)

(72) Inventors: Alexandros Manolakos, San Diego, CA (US); Joseph Binamira Soriaga, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 16/889,534

(22) Filed: Jun. 1, 2020

(65) Prior Publication Data
US 2020/0389284 A1 Dec. 10, 2020

(51) Int. Cl.
*H04W 72/04* (2009.01)
*H04L 5/10* (2006.01)
(Continued)

(52) U.S. Cl.
CPC .......... *H04L 5/10* (2013.01); *H04L 5/005* (2013.01); *H04L 5/0082* (2013.01);
(Continued)

(58) Field of Classification Search
CPC ......... H04L 5/10; H04L 5/005; H04L 5/0082; H04L 5/0092; H04L 5/0051;
(Continued)

(56) References Cited

U.S. PATENT DOCUMENTS

2015/0229444 A1\* 8/2015 Webb ............... H04W 72/1278
370/329
2015/0280876 A1\* 10/2015 You .......................... H04L 1/08
370/329
(Continued)

FOREIGN PATENT DOCUMENTS

WO WO-2016032632 A1 3/2016

OTHER PUBLICATIONS

International Search Report and Written Opinion—PCT/US2020/035678—ISA/EPO—dated Sep. 7, 2020.

*Primary Examiner* — Hassan Kizou
*Assistant Examiner* — Mahbubul Bar Chowdhury
(74) *Attorney, Agent, or Firm* — Holland & Hart, LLP

(57) ABSTRACT

Methods, systems, and devices for wireless communications are described. Generally, the described techniques provide for signaling a semi-static configuration for demodulation reference signal (DMRS) bundling across non-uniform bundles of transmission time intervals (TTIs). A base station may transmit control signaling to a user equipment (UE) that schedules resources for DMRSs and associated data channels across the TTIs. For example, the base station may transmit a bundling configuration to the UE that may configure a bundling sequence defining an order for the bundles and a number of TTIs for each bundle. Based on the control signaling, the UE may determine a reference signal bundling pattern for receiving the DMRSs and the associated data channels, where the reference signal bundling pattern may indicate the bundling sequence. The UE may accordingly receive the DMRSs and the associated data channels and perform channel estimation on the data channels.

30 Claims, 21 Drawing Sheets

(51) Int. Cl.
*H04L 5/00* (2006.01)
*H04W 80/02* (2009.01)
*H04L 25/02* (2006.01)
*H04L 27/26* (2006.01)

(52) U.S. Cl.
CPC ...... *H04L 25/0226* (2013.01); *H04L 27/2613* (2013.01); *H04W 72/042* (2013.01); *H04W 72/0493* (2013.01); *H04W 80/02* (2013.01)

(58) Field of Classification Search
CPC ............... H04L 5/0007; H04L 25/0226; H04L 25/0204; H04L 25/0224; H04L 27/2613; H04W 72/0493; H04W 72/042; H04W 80/02; H04W 4/70; H04B 7/04
See application file for complete search history.

(56) References Cited

U.S. PATENT DOCUMENTS

| | | | |
|---|---|---|---|
| 2016/0065341 A1* | 3/2016 | Yoo | H04W 72/0446 370/336 |
| 2016/0270059 A1 | 9/2016 | Chen et al. | |
| 2019/0007181 A1* | 1/2019 | Marinier | H04L 5/0007 |
| 2019/0313436 A1* | 10/2019 | Lee | H04W 72/042 |
| 2020/0287682 A1* | 9/2020 | Bagheri | H04L 5/0044 |
| 2021/0144716 A1* | 5/2021 | Choi | H04W 72/042 |
| 2021/0153207 A1* | 5/2021 | Bhamri | H04L 5/0048 |
| 2021/0212108 A1* | 7/2021 | Lou | H04W 72/1257 |

* cited by examiner

NON-UNIFORM DEMODULATION REFERENCE SIGNAL BUNDLING

CROSS REFERENCE

The present application for patent claims the benefit of Greek Provisional Patent Application No. 20190100250 by MANOLAKOS et al., entitled "NON-UNIFORM DEMODULATION REFERENCE SIGNAL BUNDLING," filed Jun. 7, 2019, assigned to the assignee hereof, and expressly incorporated by reference in its entirety.

BACKGROUND

The following relates generally to wireless communications, and more specifically to non-uniform demodulation reference signal (DMRS) bundling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-s-OFDM). A wireless multiple-access communications system may include a number of base stations or network access nodes, each simultaneously supporting communication for multiple communication devices, which may be otherwise known as user equipment (UE).

In some wireless communications systems, a base station and a UE may transmit and receive various reference signals associated with data channel transmissions, such as DMRSs. The UE may use DMRSs to estimate channel characteristics of the data channel, and the UE may use the estimated channel characteristics to perform demodulation or decoding of transmissions communicated over the estimated channel. In some cases, the base station may determine a precoding based on its own channel estimates of reference signals received from the UE (e.g., sounding reference signals (SRSs)), and the base station may apply the precoding to the DMRS transmissions transmitted to the UE. In some cases, the base station may determine that different precoding may provide comparative improvements for different transmission time intervals (TTIs) of a sequence of TTIs configured for downlink transmissions.

SUMMARY

The described techniques relate to improved methods, systems, devices, and apparatuses that support non-uniform demodulation reference signal (DMRS) bundling. Generally, the described techniques provide for determining, configuring, and signaling a semi-static configuration for non-uniform DMRS bundling across a plurality of transmission time intervals (TTIs). The base station may transmit control signaling to the user equipment (UE) that schedules resources for DMRSs and for associated data channels across a sequence of TTIs. For example, the base station may transmit a bundling configuration to the UE in the control signaling that indicates a common configuration for the DMRSs for one or more TTI bundles. A TTI bundle may include one or more TTIs for which there is a common DMRS configuration for all the TTIs of that bundle. In some cases, at least some of the bundles of TTIs associated with the bundling configuration may be non-uniform (e.g., a first bundle may include two TTIs, and a second bundle may include three TTIs). The bundling configuration may configure parameters (including, e.g., a precoding parameter) for communicating DMRSs for each of the bundles of TTIs. For example, the bundling configuration may configure a bundling sequence that defines an order for multiple bundles and a number of TTIs for each respective bundle. In some cases, the bundling configuration for non-uniform bundles may be semi-static, in that the base station may configure different parameters for communicating the DMRSs for each of the bundles of TTIs.

Based on the control signaling, the UE may determine a reference signal bundling pattern to receive the DMRSs and the associated data channels, where the reference signal bundling pattern may indicate a sequence of bundled TTIs, each of the bundled TTIs sharing a common configuration, as configured by the bundling configuration received from the base station. For example, the sequence may define an order and number of bundles of TTIs, and a number of TTIs for each of the bundles. In some cases, the base station may further determine and signal to the UE a reference time at which to begin a bundling sequence. The reference time may coincide with a first TTI of a first bundle, for example, at a first DMRS transmission in the first TTI. The UE may receive the plurality of DMRSs and data channels according to the reference signal bundling pattern, and the UE may perform channel estimation on the data channels.

A method of wireless communication at a UE is described. The method may include receiving control signaling that schedules resources for receiving a set of DMRSs and a set of associated data channels across a set of TTIs, determining a reference signal bundling pattern for receiving the set of DMRSs and the set of associated data channels according to the control signaling, where the reference signal bundling pattern indicates that one or more of the set of TTIs are bundled as a set of reference signal bundled TTIs, at least two of the set of reference signal bundled TTIs having different durations, receiving the set of DMRSs and the associated data channels according to the reference signal bundling pattern, and performing channel estimation based on the received set of DMRSs and the associated data channels.

An apparatus for wireless communication at a UE is described. The apparatus may include a processor, memory coupled with the processor, and instructions stored in the memory. The instructions may be executable by the processor to cause the apparatus to receive control signaling that schedules resources for receiving a set of DMRSs and a set of associated data channels across a set of TTIs, determine a reference signal bundling pattern for receiving the set of DMRSs and the set of associated data channels according to the control signaling, where the reference signal bundling pattern indicates that one or more of the set of TTIs are bundled as a set of reference signal bundled TTIs, at least two of the set of reference signal bundled TTIs having different durations, receive the set of DMRSs and the associated data channels according to the reference signal bundling pattern, and perform channel estimation based on the received set of DMRSs and the associated data channels.

Another apparatus for wireless communication at a UE is described. The apparatus may include means for receiving control signaling that schedules resources for receiving a set of DMRSs and a set of associated data channels across a set of TTIs, determining a reference signal bundling pattern for receiving the set of DMRSs and the set of associated data channels according to the control signaling, where the reference signal bundling pattern indicates that one or more of the set of TTIs are bundled as a set of reference signal bundled TTIs, at least two of the set of reference signal bundled TTIs having different durations, receiving the set of DMRSs and the associated data channels according to the reference signal bundling pattern, and performing channel estimation based on the received set of DMRSs and the associated data channels.

A non-transitory computer-readable medium storing code for wireless communication at a UE is described. The code may include instructions executable by a processor to receive control signaling that schedules resources for receiving a set of DMRSs and a set of associated data channels across a set of TTIs, determine a reference signal bundling pattern for receiving the set of DMRSs and the set of associated data channels according to the control signaling, where the reference signal bundling pattern indicates that one or more of the set of TTIs are bundled as a set of reference signal bundled TTIs, at least two of the set of reference signal bundled TTIs having different durations, receive the set of DMRSs and the associated data channels according to the reference signal bundling pattern, and perform channel estimation based on the received set of DMRSs and the associated data channels.

Some examples of the method, apparatuses, and non-transitory computer-readable medium described herein may further include operations, features, means, or instructions for demodulating the data channels based on performing channel estimation using the received set of DMRSs.

Some examples of the method, apparatuses, and non-transitory computer-readable medium described herein may further include operations, features, means, or instructions for determining a reference time at which to receive an initial DMRS of the set of DMRSs during one of the set of reference signal bundled TTIs according to the reference signal bundling pattern.

Some examples of the method, apparatuses, and non-transitory computer-readable medium described herein may further include operations, features, means, or instructions for transmitting a sounding reference signal (SRS) during a first TTI, where the reference time may be determined to be within a second TTI, the second TTI following the first TTI. In some examples of the method, apparatuses, and non-transitory computer-readable medium described herein, the first TTI immediately follows the second TTI, and the first TTI includes a latest transmission of the SRS. In some examples of the method, apparatuses, and non-transitory computer-readable medium described herein, the SRS may be associated with a use case of antenna switching.

Some examples of the method, apparatuses, and non-transitory computer-readable medium described herein may further include operations, features, means, or instructions for receiving an indication of an offset, where a duration of the offset begins following a latest SRS, and the reference time may be determined to be a time at an end of the duration of the offset and within the second TTI. Some examples of the method, apparatuses, and non-transitory computer-readable medium described herein may further include operations, features, means, or instructions for receiving an indication of an offset, where a duration of the offset begins at a beginning of the second TTI, and the reference time may be determined to be a time at an end of the duration of the offset and within the second TTI.

Some examples of the method, apparatuses, and non-transitory computer-readable medium described herein may further include operations, features, means, or instructions for receiving an initial data transmission after transmitting the SRS, where the reference time may be determined to be a time following the initial data transmission. In some examples of the method, apparatuses, and non-transitory computer-readable medium described herein, the initial data transmission may be received in a physical downlink shared channel (PDSCH).

In some examples of the method, apparatuses, and non-transitory computer-readable medium described herein, the control signaling may include operations, features, means, or instructions for receiving a trigger message in a PDSCH after transmitting the SRS, and the reference signal bundling pattern may be determined according to the first reference signal bundling pattern configuration or the second reference signal bundling pattern configuration based on the trigger message. In some examples of the method, apparatuses, and non-transitory computer-readable medium described herein, the trigger message may be received in downlink control information (DCI) in the PDSCH.

In some examples of the method, apparatuses, and non-transitory computer-readable medium described herein, the reference time may be determined based on a boundary of a set of one or more TTIs of the set of TTIs. In some examples of the method, apparatuses, and non-transitory computer-readable medium described herein, the boundary of the set of one or more TTIs includes a frame boundary.

Some examples of the method, apparatuses, and non-transitory computer-readable medium described herein may further include operations, features, means, or instructions for receiving a trigger message, where the reference time may be determined based on the trigger message. In some examples of the method, apparatuses, and non-transitory computer-readable medium described herein, the trigger message further includes an offset, and the reference time may be at a time following the offset. In some examples of the method, apparatuses, and non-transitory computer-readable medium described herein, the trigger message may be received in a medium access control (MAC) control element (CE).

In some examples of the method, apparatuses, and non-transitory computer-readable medium described herein, the reference signal bundling pattern indicates that the UE may be to assume a same precoding for receiving transmissions in each bundled TTI of the set of reference signal bundled TTIs.

Some examples of the method, apparatuses, and non-transitory computer-readable medium described herein may further include operations, features, means, or instructions for transmitting a capability message indicating a capability of the UE to support the reference signal bundling pattern for receiving the set of DMRSs.

In some examples of the method, apparatuses, and non-transitory computer-readable medium described herein, the reference signal bundling pattern may be based on a type of wireless communications system including the UE. In some examples of the method, apparatuses, and non-transitory computer-readable medium described herein, the type of wireless communications system may be one or more of enhanced mobile broadband (eMBB) or ultra-reliable, low latency communications (URLLC).

In some examples of the method, apparatuses, and non-transitory computer-readable medium described herein, the reference signal bundling pattern may be based on a channel type in which the set of DMRSs may be received. In some examples of the method, apparatuses, and non-transitory computer-readable medium described herein, the channel type includes one of a first type of PDSCH or a second type of PDSCH, and where the first type of PDSCH may be associated with receiving an initial DMRS of the set of DMRSs based on a starting time of a set of one or more TTIs, and the second type of PDSCH may be associated with receiving the initial DMRS based on a starting time of an allocation for the scheduled resources.

Some examples of the method, apparatuses, and non-transitory computer-readable medium described herein may further include operations, features, means, or instructions for transmitting a SRS, and determining that the SRS was not successfully received, where the reference signal bundling pattern may be based on determining that the SRS was not successfully received.

Some examples of the method, apparatuses, and non-transitory computer-readable medium described herein may further include operations, features, means, or instructions for transmitting a SRS on a set of physical resource blocks (PRBs), each of the PRBs including corresponding ones of the set of associated data channels, where the reference signal bundling pattern applies to the PRBs of the associated data channel corresponding to the set of PRBs, and not to PRBs of the associated data channel not corresponding to the set of PRBs.

In some examples of the method, apparatuses, and non-transitory computer-readable medium described herein, the plurality of reference signal bundled TTIs includes a first reference signal bundled TTI and a second reference signal bundled TTI, the first reference signal bundled TTI including a first number of TTIs and second reference signal bundled TTI including a second number of TTIs, and where the first number of TTIs is different from the second number of TTIs.

A method of wireless communication at a base station is described. The method may include determining a reference signal bundling pattern for transmitting a set of DMRSs and a set of associated data channels across a set of TTIs, where the reference signal bundling pattern indicates that one or more of the set of TTIs are bundled as a set of reference signal bundled TTIs, at least two of the set of reference signal bundled TTIs having different durations, transmitting control signaling indicating the reference signal bundling pattern that schedules resources for transmitting the set of DMRSs and the set of associated data channels across the set of TTIs, and transmitting the set of DMRSs and the associated data channels according to the reference signal bundling pattern.

An apparatus for wireless communication at a base station is described. The apparatus may include a processor, memory coupled with the processor, and instructions stored in the memory. The instructions may be executable by the processor to cause the apparatus to determine a reference signal bundling pattern for transmitting a set of DMRSs and a set of associated data channels across a set of TTIs, where the reference signal bundling pattern indicates that one or more of the set of TTIs are bundled as a set of reference signal bundled TTIs, at least two of the set of reference signal bundled TTIs having different durations, transmit control signaling indicating the reference signal bundling pattern that schedules resources for transmitting the set of DMRSs and the set of associated data channels across the set of TTIs, and transmit the set of DMRSs and the associated data channels according to the reference signal bundling pattern.

Another apparatus for wireless communication at a base station is described. The apparatus may include means for determining a reference signal bundling pattern for transmitting a set of DMRSs and a set of associated data channels across a set of TTIs, where the reference signal bundling pattern indicates that one or more of the set of TTIs are bundled as a set of reference signal bundled TTIs, at least two of the set of reference signal bundled TTIs having different durations, transmitting control signaling indicating the reference signal bundling pattern that schedules resources for transmitting the set of DMRSs and the set of associated data channels across the set of TTIs, and transmitting the set of DMRSs and the associated data channels according to the reference signal bundling pattern.

A non-transitory computer-readable medium storing code for wireless communication at a base station is described. The code may include instructions executable by a processor to determine a reference signal bundling pattern for transmitting a set of DMRSs and a set of associated data channels across a set of TTIs, where the reference signal bundling pattern indicates that one or more of the set of TTIs are bundled as a set of reference signal bundled TTIs, at least two of the set of reference signal bundled TTIs having different durations, transmit control signaling indicating the reference signal bundling pattern that schedules resources for transmitting the set of DMRSs and the set of associated data channels across the set of TTIs, and transmit the set of DMRSs and the associated data channels according to the reference signal bundling pattern.

Some examples of the method, apparatuses, and non-transitory computer-readable medium described herein may further include operations, features, means, or instructions for determining a reference time at which to transmit an initial DMRS of the set of DMRSs during one of the set of reference signal bundled TTIs according to the reference signal bundling pattern.

Some examples of the method, apparatuses, and non-transitory computer-readable medium described herein may further include operations, features, means, or instructions for receiving a SRS during a first TTI, where the reference time may be determined to be within a second TTI, the second TTI following the first TTI. In some examples of the method, apparatuses, and non-transitory computer-readable medium described herein, the first TTI immediately follows the second TTI, and the first TTI includes a latest transmission of the SRS. Some examples of the method, apparatuses, and non-transitory computer-readable medium described herein may further include operations, features, means, or instructions for performing a channel measurement based on the SRS, where the SRS may be associated with a use case of antenna switching.

Some examples of the method, apparatuses, and non-transitory computer-readable medium described herein may further include operations, features, means, or instructions for transmitting an indication of an offset, where a duration of the offset begins following a latest SRS, and the reference time may be determined to be a time at an end of the duration of the offset and within the second TTI. Some examples of the method, apparatuses, and non-transitory computer-readable medium described herein may further include operations, features, means, or instructions for transmitting an indication of an offset, where a duration of the offset begins at a beginning of the second TTI, and the reference time may be determined to be a time at an end of the duration of the offset and within the second TTI.

Some examples of the method, apparatuses, and non-transitory computer-readable medium described herein may further include operations, features, means, or instructions for transmitting an initial data transmission after transmitting the SRS, where the reference time may be determined to be a time following the initial data transmission. In some examples of the method, apparatuses, and non-transitory computer-readable medium described herein, the initial data transmission may be transmitted in a PDSCH.

In some examples of the method, apparatuses, and non-transitory computer-readable medium described herein, the control signaling may include operations, features, means, or instructions for transmitting a trigger message in a PDSCH after transmitting the SRS, and the reference signal bundling pattern may be determined according to the first reference signal bundling pattern configuration or the second reference signal bundling pattern configuration based on the trigger message. In some examples of the method, apparatuses, and non-transitory computer-readable medium described herein, the trigger message may be transmitted in DCI in the PDSCH.

In some examples of the method, apparatuses, and non-transitory computer-readable medium described herein, the reference time may be determined based on a boundary of a set of one or more TTIs of the set of TTIs. In some examples of the method, apparatuses, and non-transitory computer-readable medium described herein, the boundary of the set of one or more TTIs includes a frame boundary.

Some examples of the method, apparatuses, and non-transitory computer-readable medium described herein may further include operations, features, means, or instructions for transmitting a trigger message, where the reference time may be based on the trigger message. In some examples of the method, apparatuses, and non-transitory computer-readable medium described herein, the trigger message further includes an offset, and the reference time may be at a time following the offset. In some examples of the method, apparatuses, and non-transitory computer-readable medium described herein, the trigger message may be transmitted in a MAC CE.

In some examples of the method, apparatuses, and non-transitory computer-readable medium described herein, the reference signal bundling pattern indicates that the base station may be to apply a same precoder for each bundled TTI of the set of reference signal bundled TTIs.

Some examples of the method, apparatuses, and non-transitory computer-readable medium described herein may further include operations, features, means, or instructions for receiving a capability message indicating a capability of a UE to support the reference signal bundling pattern for the set of DMRSs. In some examples of the method, apparatuses, and non-transitory computer-readable medium described herein, the reference signal bundling pattern may be based on a type of wireless communications system including the base station. In some examples of the method, apparatuses, and non-transitory computer-readable medium described herein, the type of wireless communications system may be one or more of eMBB or URLLC.

In some examples of the method, apparatuses, and non-transitory computer-readable medium described herein, the reference signal bundling pattern may be based on a channel type in which the set of DMRSs may be transmitted. In some examples of the method, apparatuses, and non-transitory computer-readable medium described herein, the channel type includes one of a first type of PDSCH or a second type of PDSCH, and where the first type of PDSCH may be associated with transmitting an initial DMRS of the set of DMRSs based on a starting time of a set of one or more TTIs, and the second type of PDSCH may be associated with transmitting the initial DMRS based on a starting time of an allocation for the scheduled resources.

Some examples of the method, apparatuses, and non-transitory computer-readable medium described herein may further include operations, features, means, or instructions for receiving a SRS, and determining that the SRS was not successfully received, where the reference signal bundling pattern may be based on determining that the SRS was not successfully received.

Some examples of the method, apparatuses, and non-transitory computer-readable medium described herein may further include operations, features, means, or instructions for receiving a SRS on a set of PRBs, each of the PRBs including corresponding ones of the set of associated data channels, where the reference signal bundling pattern applies to the PRBs of the associated data channel corresponding to the set of PRBs, and not to PRBs of the associated data channel not corresponding to the set of PRBs.

In some examples of the method, apparatuses, and non-transitory computer-readable medium described herein, the plurality of reference signal bundled TTIs includes a first reference signal bundled TTI and a second reference signal bundled TTI, the first reference signal bundled TTI including a first number of TTIs and second reference signal bundled TTI including a second number of TTIs, and where the first number of TTIs is different from the second number of TTIs.

DETAILED DESCRIPTION

Figure 1:
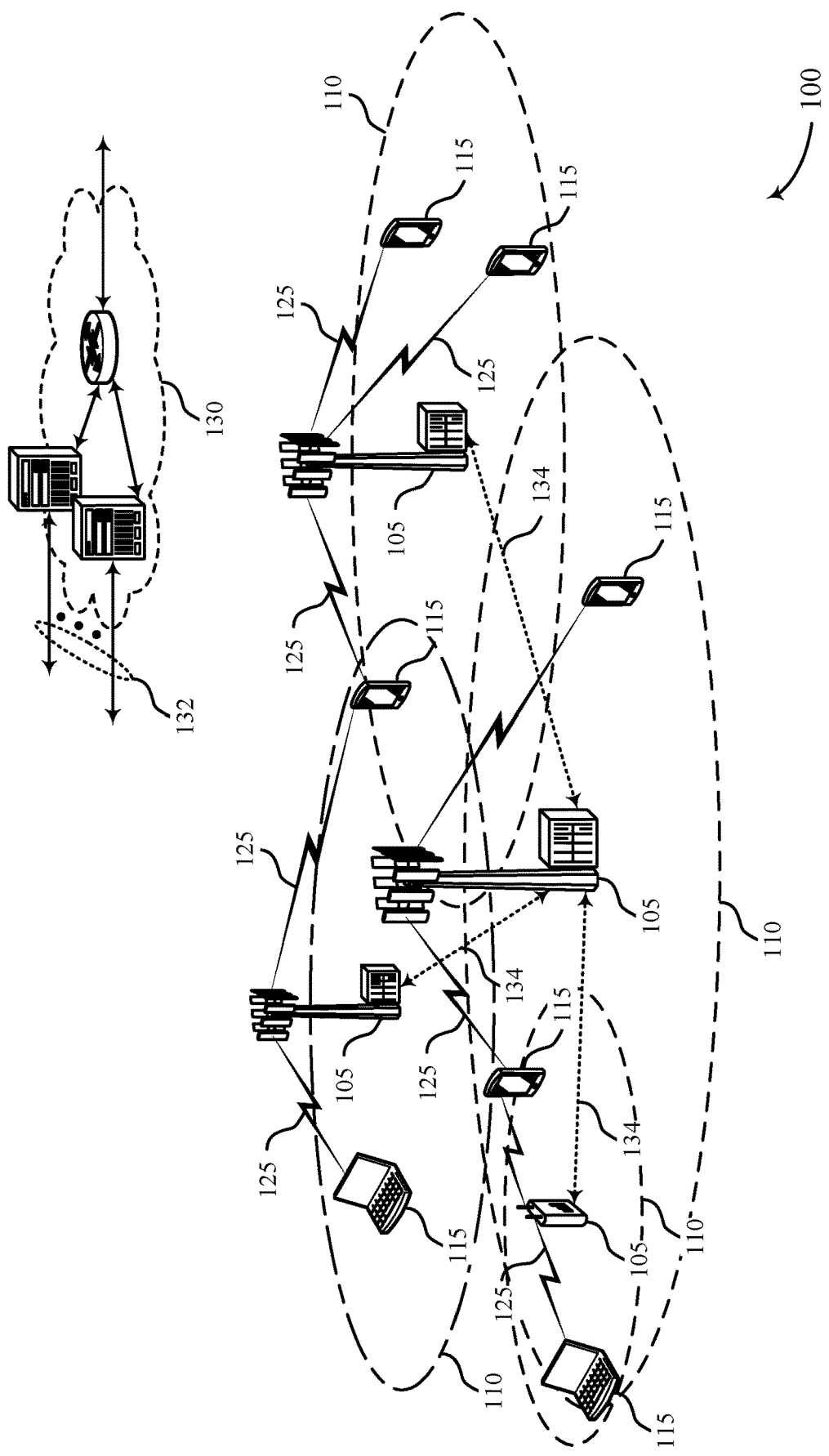
FIG. 1 illustrates an example of a wireless communications system that supports non-uniform demodulation reference signal (DMRS) bundling in accordance with aspects of the present disclosure.

In some wireless communications systems, a base station and a user equipment (UE) may transmit and receive various reference signals associated with data channel transmissions, such as demodulation reference signals (DMRSs). A DMRS may include, for example, a reference signal communicated with a data channel (either downlink, uplink, or sidelink). A DMRS may be communicated using a DMRS pattern, where the DMRS pattern may include a set of parameters defining a resource allocation of time, frequency, and spectral resources for the DMRSs, a multiplexing scheme and/or an antenna port mapping for the DMRSs in the frequency, time, and code domain, a scrambling code to be applied to the DMRSs, and the like. The UE may use DMRSs to estimate channel characteristics (e.g., via channel quality measurements) of the channel or channels on which the base station and the UE communicate data. The UE may then use the estimated channel characteristics to perform demodulation and/or decoding of transmissions communicated over the estimated channel.

In some cases, the UE may be configured to transmit one or more reference signals (e.g., sounding reference signals (SRSs)) to the base station, and the base station may perform downlink channel estimation using the SRSs received from the UE. Downlink channel estimation may enable the base station to maintain reliable channel conditions, which may, for example, help the base station configure communications with the UE to reduce latency, to avoid interference, and to meet reliability requirements. For example, the base station may determine a precoding for a transmission beam that the base station may use to transmit the DMRSs to the UE. For example, the base station may transmit one or more DMRSs to the UE in each of one or more TTIs (e.g., scheduling units such as slots, mini-slots, a combination of slots and mini-slots, frames, subframes, symbol groups, etc.) following the SRS transmission until a further SRS is scheduled to be communicated between the UE and the base station. In some cases, the UE may periodically transmit the SRSs to the base station, for example, according to a configured periodicity.

After receiving the first SRS, for example, the base station may communicate with the UE over each of the TTIs until the base station receives the second SRS. For example, the base station may transmit one or more DMRSs to the UE in each of the TTIs. The base station may apply a determined precoding to the DMRS transmissions (e.g., determined based on the first SRS). In some cases, the base station may determine that different precoding (e.g., by different precoders) may provide relative improvements for different TTIs along the transmission timeline. As such, in some wireless communications systems, the base station may specifically configure the DMRSs for each TTI, and the UE may spend a substantial amount of time and processing resources to receive and process these configurations for each TTI. Alternatively, the base station may transmit a bundling configuration to the UE that signals to the UE that a common configuration for the DMRSs will be used across all of the TTIs between two SRS transmissions. Using one bundled configuration for all of the TTIs between SRS transmissions (e.g., ten TTIs), however, may at times result in the base station using an inefficient precoding for an extended number of TTIs because of a relative lack of granularity for configuring adjustments to the precoding and other parameters for communicating the DMRSs.

Accordingly, techniques are provided herein for determining, configuring, and signaling a semi-static configuration for non-uniform DMRS bundling. For example, the base station may transmit a bundling configuration to the UE, where the bundling configuration may provide configurations for non-uniform bundles of TTIs (i.e., different bundles of the configuration may include different numbers of TTIs, and the different bundles may be configured accordingly). For example, the bundling configuration may configure a bundling sequence that defines an order for multiple bundles and a number of TTIs for each respective bundle. In the bundling configuration, the base station may configure parameters that are common across a bundle of TTIs, such as a common precoding, to coherently transmit the DMRSs in each of the TTIs of each respective bundle. Accordingly, the UE may assume that a common precoder is used to transmit the DMRSs across some or all of the data channels of each bundle. In this way, the UE may coherently filter the received DMRSs to improve the accuracy of its channel estimation procedures by jointly processing the DMRSs received in each bundle. The bundling configuration for the non-uniform bundles may further be semi-static, in that the base station may configure different parameters for communicating the DMRSs according to each of the different bundles. For example, the base station may indicate, in the bundling configuration transmitted to the UE, a different precoding for each of multiple bundles of TTIs between the first SRS and the second SRS.

In an example bundling sequence, bundles near the first SRS transmission received from the UE may be shorter (e.g., include less TTIs per bundle). After some time, such as for the later TTIs in the sequence, the channel estimates that the base station obtained based on the first SRS will become older, and thus may be less accurate due to any intervening changes in channel conditions. Thus, the sequence may configure relatively longer bundles (e.g., including more TTIs) for bundles that are later in the sequence, which may provide processing gains due to the consistent configuration across several TTIs.

In some cases, the base station may determine a reference time at which to begin a bundling sequence, or based on which a start of the bundling sequence may be determined. That is, the reference time may coincide with the first TTI of the first bundle, for example, at a first DMRS transmission in the first TTI. Alternatively, the reference time may define a point with reference to which the sequence of bundled TTIs may be defined. Several techniques are provided herein that may be utilized to determine, define, and/or configure the reference time for the bundling sequence.

Aspects of the disclosure are initially described in the context of a wireless communications system. Aspects of the disclosure are then described with reference to example resource configurations, an example transmission timeline, and an example process flow. Aspects of the disclosure are further illustrated by and described with reference to apparatus diagrams, system diagrams, and flowcharts that relate to non-uniform DMRS bundling.

FIG. 1 illustrates an example of a wireless communications system 100 that supports non-uniform DMRS bundling in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID) and a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-s-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 and a UE 115 may communicate reference signals associated with data channel transmissions, such as DMRSs. For example, the UE 115 may use the DMRSs to estimate channel characteristics (e.g., via channel quality measurements) of wireless channels over which the base station 105 and the UE 115 communicate data. The UE 115 may use estimated channel characteristics from the DMRSs to demodulate transmissions received from the base station 105 or decode the associated channel.

In some cases, the UE 115 may transmit one or more reference signals (e.g., SRSs) to the base station 105 to sound a channel for subsequent transmissions. Based on the reference signals received from the UE 115, the base station 105 may determine a precoding for a transmission beam for transmitting the DMRSs to the UE 115. For example, the base station 105 may select a precoding setting to apply for a beam for which the base station 105 received an SRS to provide relatively reliable communication of subsequent DMRSs.

The base station 105 may transmit one or more DMRSs to the UE 115 in each of one or more TTIs (e.g., scheduling units such as slots, mini-slots, a combination of slots and mini-slots, frames, subframes, symbol groups, etc.) following the SRS transmission until a further SRS is scheduled to be communicated between the UE 115 and the base station 105. The base station 105 may apply a particular precoding for transmitting the DMRS transmissions of each TTI between the SRSs. In some cases, the base station 105 may configure the UE 115 with a bundling configuration for the reference signals (e.g., a DMRS bundling configuration) of certain groups of one or more TTIs of the TTIs between the SRSs. For example, the bundling configuration may bundle groups of TTIs in a particular sequence or pattern (e.g., a bundle of one TTI, followed by a bundle of two TTIs, followed by a bundle of three TTIs, etc.).

In the bundling configuration, the base station 105 may configure common parameters for each bundle, such as a common precoding, to coherently transmit the DMRSs in each of the TTIs of each respective bundle. Accordingly, the UE 115 may assume that a common precoder is used to transmit the DMRSs across some or all of the data channels of each bundle. In this way, the UE 115 may coherently filter the received DMRSs (e.g., leveraging knowledge of a common phase of the DMRSs across TTIs of one bundle) to improve the accuracy of its channel estimation procedures by jointly processing the DMRSs received in each bundle. In some cases, as described herein, the bundling configuration may be a semi-static bundling configuration (e.g., a bundling configuration that is defined, e.g., between two SRS transmissions, for a subset of a particular frame, etc.). That is, a semi-static bundling configuration may be set for a certain time (or certain number of resources, etc.), as opposed to, for example, a persistent configuration.

In some cases, the base station 105 and the UE 115 may use a number of different techniques to signal the bundling configuration. For example, the base station 105 may transmit an indication (e.g., a one-bit indication) to the UE 115 to inform the UE 115 whether the UE 115 is to use bundling for the physical resource blocks (PRBs) of interfering signals (e.g., all received intervening transmissions). Based on the indication, the UE 115 may apply the bundling configuration across PRBs of communications received from the base station 105 (e.g., until the base station 105 signals otherwise to the UE 115). Alternatively, the base station 105 may transmit an indication (e.g., a one-bit indication) to the UE 115 of a particular VCID to indicate to the UE 115 whether the UE 115 is to use bundling for the PRBs of signals received including the corresponding VCID (i.e., configuring bundling on a per-VCID basis). Based on the indication, the UE 115 may apply the bundling configuration across the PRBs of communications received that include the corresponding VCID.

In another example, the base station 105 may transmit an indication to the UE 115 including a range of VCIDs to indicate to the UE 115 whether the UE 115 is to use bundling across the PRBs of signals received including a VCID from the indicated range of VCIDs. Based on the indication, the UE 115 may apply the bundling configuration across PRBs of communications received that include a VCID of the indicated range. In some cases, a UE 115 may be configured for coordinated multipoint (CoMP) communications. In these cases, a CoMP configuration may include a bundling configuration for the UE 115, and, in some such cases, the base station 105 may signal to the UE 115 to use the same information as included in the CoMP configuration.

As described herein, the bundling configuration may indicate that the UE 115 is to apply the bundling across one or more PRBs of received communications (e.g., from the base station 105). In some cases, the bundling configuration may additionally or alternatively indicate that the UE 115 is to apply the bundling across one or more subframes of received communications. In some cases, the bundling configuration may further indicate a dependency for multicast-broadcast single-frequency network (MBSFN) communications, for example, indicating whether bundling is to be applied (or is not to be applied) for subframes configured for MBSFN communications and/or subframes not configured for MBSFN communications. For example, for communications over subframes not configured for MBSFN communications, bundling may be aligned with the physical resource groups (PRGs) of the corresponding communications. In some cases (e.g., for communications over subframes configured for MB SFN communications), bundling may not be aligned with the PRGs of the corresponding communications. In these cases, the base station 105 may signal the bundling configuration to the UE 115 via control signaling using a particular format (e.g., downlink control information (DCI) Format 1A), for example, of a set of several formats, to relatively reduce a likelihood that the bundles are aligned with the PRGs of the corresponding communications.

In some cases, PRB bundling according to the bundling configuration may be linked to (e.g., directly correlated with) a modulation order for the corresponding transmissions. That is, the base station 105 may indicate to the UE 115 in the bundling configuration that bundling across PRBs is enabled for certain modulation schemes and not for others (e.g., indicating that PRB bundling is enabled for higher order modulation schemes). Additionally or alternatively, the base station 105 may indicate to the UE 115 in the bundling configuration that a PRB bundling size (e.g., a number of consecutive time-domain resources) for higher order modulation schemes (e.g., 256 quadrature amplitude modulation (QAM)) may be configured to be relatively greater than for other modulation schemes (e.g., lower order QAM schemes).

In some cases, PRB bundling according to the bundling configuration may be linked to a type of the associated transmission. That is, the base station 105 may indicate to the UE 115 in the bundling configuration that bundling across PRBs is enabled for some types of transmissions and that bundling across PRBs is not enabled for other types of communications. For example, the base station 105 may signal to the UE 115 that PRB bundling is not enabled for broadcast channel transmissions (e.g., paging messages, system information block (SIB) transmissions, a broadcasted random access message such as a response message (Msg2) of a random access procedure).

The base station 105 may signal to the UE 115 whether bundling is enabled via one or more indicators of a semi-static bundling configuration. For example, a first indication may indicate to the UE 115 that bundling is not enabled for the PRGs configured by the semi-static bundling configuration. Additionally or alternatively, a second indication may indicate to the UE 115 that bundling is enabled for the configured PRGs, but that the bundling may not be strictly enforced for each of the PRGs (e.g., the bundling may be strictly enforced in only a subset of the PRGs, or only a subset of bundling parameters may be strictly enforced). Additionally or alternatively, a third indication may indicate to the UE 115 that bundling is enabled and may be strictly enforced for the bundled PRGs configured by the semi-static bundling configuration. The third indication may, for example, indicate that a rank and precoder are common (e.g., identical or substantially identical) across the bundled PRGs. Alternatively, the third indication may indicate that a first parameter, such as a cell selection parameter (e.g., a C1 parameter), and a power level (e.g., transmit power) are common (e.g., identical or substantially identical) across the bundled PRGs. Further alternatively, the third indication may indicate that a first parameter, such as a cell selection parameter (e.g., a C1 parameter), a second parameter, such as a cell reselection parameter (e.g., a C2 parameter), and a modulation order (e.g., a modulation and coding scheme (MCS)) are common (e.g., identical or substantially identical) across the bundled PRGs.

In some cases, the base station 105 may dynamically signal the bundling configuration to the UE 115. For example, the base station 105 may include an indication in a grant of resources for downlink transmissions (e.g., a physical downlink shared channel (PDSCH) grant) of whether the UE 115 is to apply bundling for interfering transmissions in a current TTI (e.g., one or more current subframes) corresponding to the grant. Additionally or alternatively, the base station 105 may indicate to the UE 115, for a current TTI, a per-VCID configuration informing the UE 115 of whether the UE 115 is to apply bundling for transmissions including a corresponding VCID in the current TTI. Additionally or alternatively, the base station 105 may transmit a bitmap to the UE 115, where the bitmap may include a number of bits corresponding to a number of associated PRBs. For example, if a resource allocation includes a number M PRBs, the bitmap may include a number M−1 elements, where a bit k indicates whether a kth PRB bundled with a k+1th PRB. Further, the base station 105 may signal (e.g., via RRC signaling) to the UE 115 whether an indication that bundling also configures a same modulation order and/or a same PDSCH on/off status across the bundled PRBs.

Techniques are provided herein for determining, configuring, and signaling a semi-static configuration for non-uniform DMRS bundling. For example, the base station 105 may transmit a bundling configuration to the UE 115, where the bundling configuration may provide configurations for non-uniform bundles of TTIs (i.e., different bundles of the configuration may include different numbers of TTIs, and the different bundles may be configured accordingly).

Figure 2:
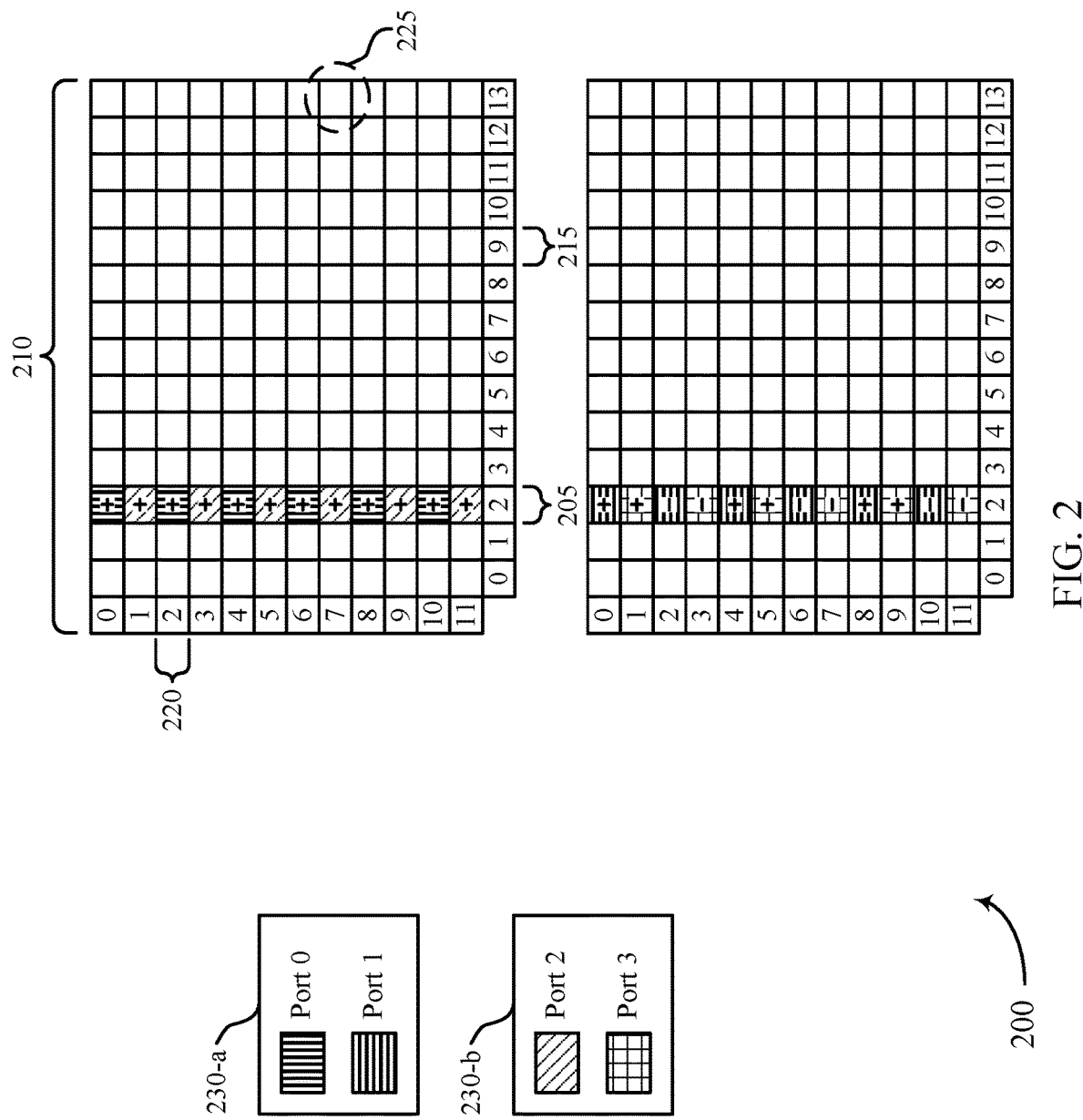
FIG. 2 illustrates an example resource configuration that supports non-uniform DMRS bundling in accordance with aspects of the present disclosure.

FIG. 2 illustrates an example resource configuration 200 that supports non-uniform DMRS bundling in accordance with aspects of the present disclosure. The resource configuration 200 illustrates an example transmission scheme and frame structure design for communications in a wireless communications system, which may implement aspects of the wireless communications system 100 as described with reference to FIG. 1. The resource configuration 200 shows a set of DMRS resources 205 (e.g., a set time-frequency resources) and a mapping to a number of antenna ports that a base station may use to transmit DMRSs to a UE, which may be examples of the corresponding devices as described with reference to FIG. 1.

The example resource configuration 200 of FIG. 2 shows two orthogonal resource blocks 210. The two resource blocks 210 may be orthogonalized using an orthogonal cover code (OCC) (e.g., a length-4 OCC). As shown, each of the resource blocks 210 includes 14 symbols 215 in the time domain and 12 subcarriers 220 in the frequency domain. A number of resource elements 225 are shown in each resource block 210, where each resource element 225 is defined by one symbol 215 in the time domain and one subcarrier 220 in the frequency domain. While the resource configuration 200 shows the resource blocks 210 as including 14 symbols 215 and 12 subcarriers 220, it is to be understood that the resource configuration 200 is only one example, and the resource configuration 200 may be analogously applied to configure a DMRS pattern for a resource block 210 including any number of uniform or non-uniform symbols 215 and subcarriers 220.

The example resource configuration 200 of FIG. 2 shows DMRS resources 205 that are configured for transmitting and receiving DMRSs of a first type (e.g., Type 1) with a length of one symbol 215 (e.g., a single-symbol length), that is, a "single-symbol Type 1" DMRS configuration. According to the resource configuration 200, the base station may transmit DMRSs over the DMRS resources 205 using up to four antenna ports. As the example resource configuration 200 shows, the DMRS resources 205 occupy a third symbol 215 (e.g., symbol 2) of each resource block 210. The resource configuration 200 shows DMRS resources 205 for a front-loaded DMRS pattern in each resource block 210. That is, the front-loaded DMRS pattern may be for an initial DMRS transmission within the resource blocks 210 using the DMRS resources 205 (e.g., an initial DMRS transmission of one or more DMRS transmissions). It is to be understood, however, that additional resource elements 225 of the resource blocks 210 may be allocated for additional DMRS transmissions subsequent to the DMRS resources 205 shown in the example resource configuration 200 of FIG. 2.

According to the single-symbol Type 1 DMRS configuration shown in the resource configuration 200, the base station may transmit DMRSs to the UE over the DMRS resources 205 using up to four antenna ports. As the resource configuration 200 shows, four antenna ports are mapped to resource elements 225 corresponding to alternating evenly and oddly numbered subcarriers 220 over one symbol 215. That is, two antenna ports are mapped to the evenly numbered subcarriers 220, and two antenna ports are mapped to the oddly numbered subcarriers 220. The DMRSs are thus transmitted using six resource elements 225 per port during the symbol 215 allocated for the DMRS resources 205. The antenna ports may be orthogonalized using a length-2 OCC, resulting in two code division multiplexing (CDM) groups 230. The first CDM group 230-a includes antenna ports 0 and 1, and the second CDM group 230-b includes antenna ports 2 and 3. In this way, the antenna ports of each CDM group 230 may transmit using spatially separated frequency and time resources.

In some cases, the resource blocks 210 may be examples of the TTIs described herein. Techniques are provided herein for determining, configuring, and signaling a semi-static configuration for non-uniform DMRS bundling of multiple TTIs. For example, the base station may transmit a bundling configuration to the UE, where the bundling configuration may provide configurations for non-uniform bundles of TTIs (i.e., different bundles of the configuration may include different numbers of TTIs, and the different bundles may be configured accordingly). In the bundling configuration, the base station may configure parameters that are common across a bundle of TTIs, such as a common precoding, to coherently transmit the DMRSs in each of the TTIs of each respective bundle. Accordingly, the UE may assume that a common precoder is used to transmit the DMRSs across some or all of the data channels of each bundle. In this way, the UE may coherently filter the received DMRSs to perform channel estimation.

Figure 3:
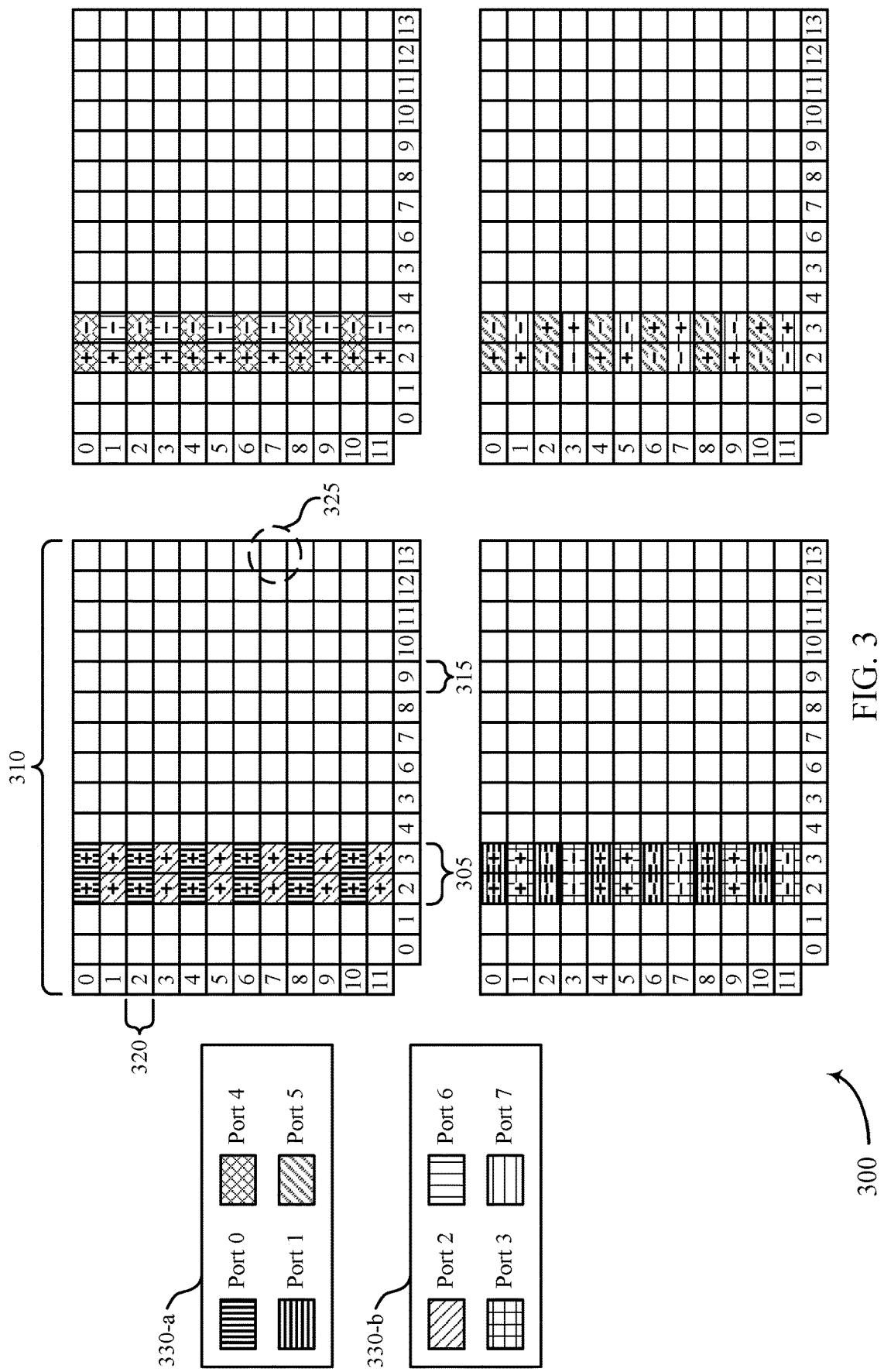
FIG. 3 illustrates an example resource configuration that supports non-uniform DMRS bundling in accordance with aspects of the present disclosure.

FIG. 3 illustrates an example resource configuration 300 that supports non-uniform DMRS bundling in accordance with aspects of the present disclosure. The resource configuration 300 illustrates an example transmission scheme and frame structure design for communications in a wireless communications system, which may implement aspects of the wireless communications system 100 as described with reference to FIG. 1. The resource configuration 300 shows a set of DMRS resources 305 (e.g., a set time-frequency resources) and a mapping to a number of antenna ports that a base station may use to transmit DMRSs to a UE, which may be examples of the corresponding devices as described with reference to FIG. 1.

The example resource configuration 300 of FIG. 3 shows four orthogonal resource blocks 310. The four resource blocks 310 may be orthogonalized using an OCC (e.g., a length-4 OCC). As shown, each of the resource blocks 310 includes 14 symbols 315 in the time domain and 12 subcarriers 320 in the frequency domain. A number of resource elements 325 are shown in each resource block 310, where each resource element 325 is defined by one symbol 315 in the time domain and one subcarrier 320 in the frequency domain. While the resource configuration 300 shows the resource blocks 310 as including 14 symbols 315 and 12 subcarriers 320, it is to be understood that the resource configuration 300 is only one example, and the resource configuration 300 may be analogously applied to configure a DMRS pattern for a resource block 310 including any number of uniform or non-uniform symbols 315 and subcarriers 320.

The example resource configuration 300 of FIG. 3 shows DMRS resources 305 that are configured for transmitting and receiving DMRSs of a first type (e.g., Type 1) with a length of two symbols 515 (e.g., a double-symbol length), that is, a "double-symbol Type 1" DMRS configuration. According to the resource configuration 300, the base station may transmit DMRSs over the DMRS resources 305 using up to eight antenna ports. As the example resource configuration 300 shows, the DMRS resources 305 occupy a third symbol 315 and a fourth symbol 315 (e.g., symbols 2 and 3) of each resource block 310. The resource configuration 300 shows DMRS resources 305 for a front-loaded DMRS pattern in each resource block 310. That is, the front-loaded DMRS pattern may be for an initial DMRS transmission within the resource blocks 310 using the DMRS resources 305 (e.g., an initial DMRS transmission of one or more DMRS transmissions). It is to be understood, however, that additional resource elements 325 of the resource blocks 310 may be allocated for additional DMRS transmissions subsequent to the DMRS resources 305 shown in the example resource configuration 300 of FIG. 3.

According to the double-symbol Type 1 DMRS configuration shown in the resource configuration 300, the base station may transmit DMRSs to the UE over the DMRS resources 305 using up to eight antenna ports. As the resource configuration 300 shows, eight antenna ports are mapped to resource elements 325 corresponding to alternating evenly and oddly numbered subcarriers 320 over two consecutive symbols 315. That is, four antenna ports are mapped to the evenly numbered subcarriers 320, and four antenna ports are mapped to the oddly numbered subcarriers 320. The DMRSs are thus transmitted using six resource elements 325 per port during the symbols 315 allocated for the DMRS resources 205. The antenna ports may be orthogonalized using a length-4 OCC, resulting in two CDM groups 330. The first CDM group 330-a includes antenna ports 0, 1, 4, and 5; and the second CDM group 330-b includes antenna ports 2, 3, 6, and 7. In this way, the antenna ports of each CDM group 330 may transmit using spatially separated frequency and time resources.

In some cases, the resource blocks 310 may be examples of the TTIs described herein. Techniques are provided herein for determining, configuring, and signaling a semi-static configuration for non-uniform DMRS bundling of multiple TTIs. For example, the base station may transmit a bundling configuration to the UE, where the bundling configuration may provide configurations for non-uniform bundles of TTIs (i.e., different bundles of the configuration may include different numbers of TTIs, and the different bundles may be configured accordingly). In the bundling configuration, the base station may configure parameters that are common across a bundle of TTIs, such as a common precoding, to coherently transmit the DMRSs in each of the TTIs of each respective bundle. Accordingly, the UE may assume that a common precoder is used to transmit the DMRSs across some or all of the data channels of each bundle. In this way, the UE may coherently filter the received DMRSs to perform channel estimation.

Figure 4:
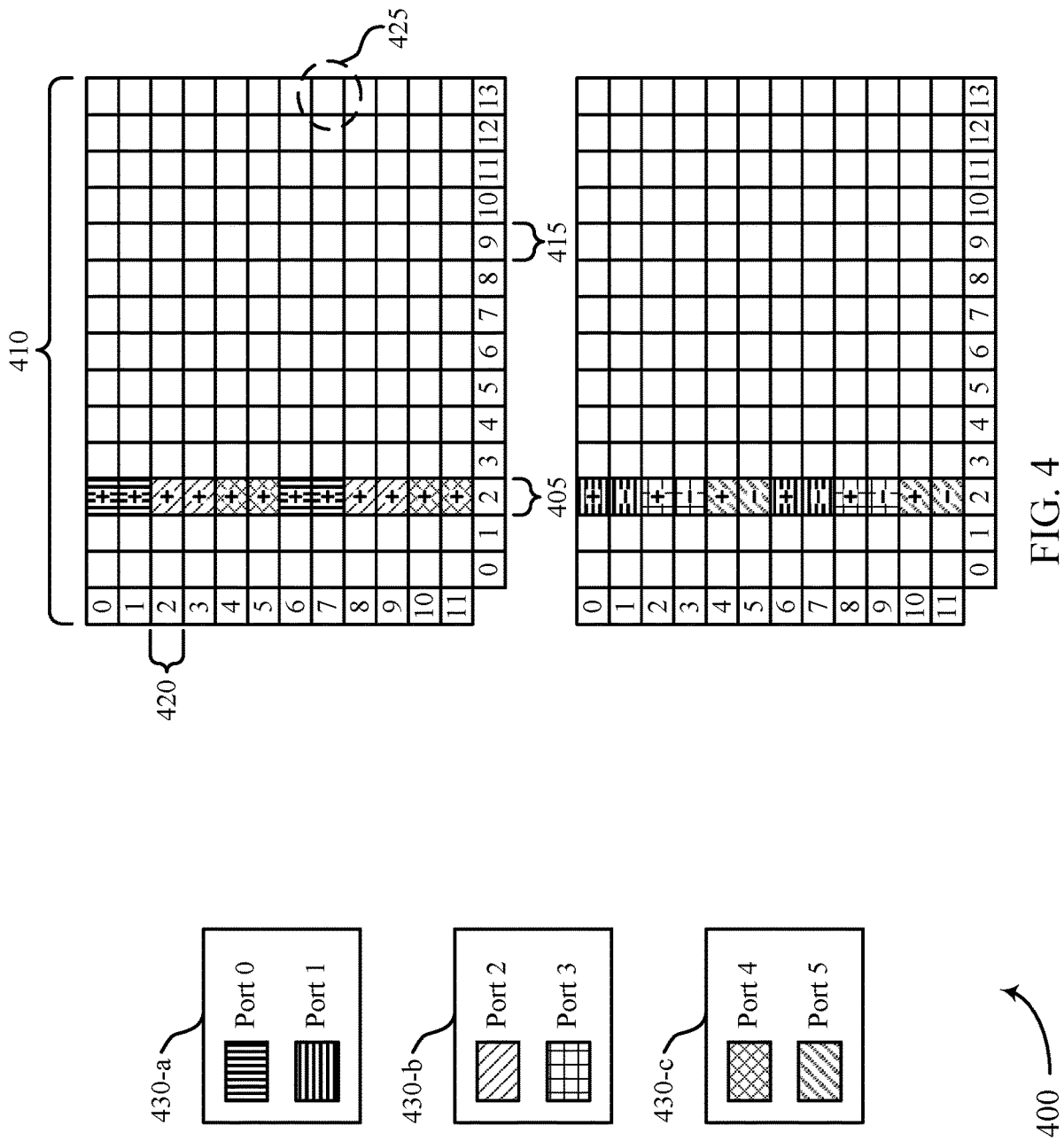
FIG. 4 illustrates an example resource configuration that supports non-uniform DMRS bundling in accordance with aspects of the present disclosure.

FIG. 4 illustrates an example resource configuration 400 that supports non-uniform DMRS bundling in accordance with aspects of the present disclosure. The resource configuration 400 illustrates an example transmission scheme and frame structure design for communications in a wireless communications system, which may implement aspects of the wireless communications system 100 as described with reference to FIG. 1. The resource configuration 400 shows a set of DMRS resources 405 (e.g., a set time-frequency resources) and a mapping to a number of antenna ports that a base station may use to transmit DMRSs to a UE, which may be examples of the corresponding devices as described with reference to FIG. 1.

The example resource configuration 400 of FIG. 4 shows two orthogonal resource blocks 410. The two resource blocks 410 may be orthogonalized using an OCC (e.g., a length-2 OCC). As shown, each of the resource blocks 410 includes 14 symbols 415 in the time domain and 12 subcarriers 420 in the frequency domain. A number of resource elements 425 are shown in each resource block 410, where each resource element 425 is defined by one symbol 415 in the time domain and one subcarrier 420 in the frequency domain. While the resource configuration 400 shows the resource blocks 410 as including 14 symbols 415 and 12 subcarriers 420, it is to be understood that the resource configuration 400 is only one example, and the resource configuration 400 may be analogously applied to configure a DMRS pattern for a resource block 410 including any number of uniform or non-uniform symbols 415 and subcarriers 420.

The example resource configuration 400 of FIG. 4 shows DMRS resources 405 that are configured for transmitting and receiving DMRSs of a second type (e.g., Type 2) with a length of one symbol 415 (e.g., a single-symbol length), that is, a "single-symbol Type 2" DMRS configuration. According to the resource configuration 400, the base station may transmit DMRSs over the DMRS resources 405 using up to six antenna ports. As the example resource configuration 400 shows, the DMRS resources 405 occupy a third symbol 415 (e.g., symbol 2) of each resource block 410. The resource configuration 400 shows DMRS resources 405 for a front-loaded DMRS pattern in each resource block 410. That is, the front-loaded DMRS pattern may be for an initial DMRS transmission within the resource blocks 410 using the DMRS resources 405 (e.g., an initial DMRS transmission of one or more DMRS transmissions). It is to be understood, however, that additional resource elements 425 of the resource blocks 410 may be allocated for additional DMRS transmissions subsequent to the DMRS resources 405 shown in the example resource configuration 400 of FIG. 4.

According to the single-symbol Type 2 DMRS configuration shown in the resource configuration 400, the base station may transmit DMRSs to the UE over the DMRS resources 405 using up to six antenna ports. As the resource configuration 400 shows, six antenna ports are mapped to resource elements 425 corresponding to consecutively numbered subcarriers 420 over one symbols 415. The DMRSs are thus transmitted using four resource elements 425 per port during the symbol 415 allocated for the DMRS resources 405. The antenna ports may be orthogonalized using a length-2 OCC, resulting in three CDM groups 430. The first CDM group 430-a includes antenna ports 0 and 1, the second CDM group 430-b includes antenna ports 2 and 3, and the third CDM group 430-c includes antenna ports 4 and 5. In this way, the antenna ports of each CDM group 430 may transmit using spatially separated frequency and time resources.

In some cases, the resource blocks 410 may be examples of the TTIs described herein. Techniques are provided herein for determining, configuring, and signaling a semi-static configuration for non-uniform DMRS bundling of multiple TTIs. For example, the base station may transmit a bundling configuration to the UE, where the bundling configuration may provide configurations for non-uniform bundles of TTIs (i.e., different bundles of the configuration may include different numbers of TTIs, and the different bundles may be configured accordingly). In the bundling configuration, the base station may configure parameters that are common across a bundle of TTIs, such as a common precoding, to coherently transmit the DMRSs in each of the TTIs of each respective bundle. Accordingly, the UE may assume that a common precoder is used to transmit the DMRSs across some or all of the data channels of each bundle. In this way, the UE may coherently filter the received DMRSs to perform channel estimation.

Figure 5:
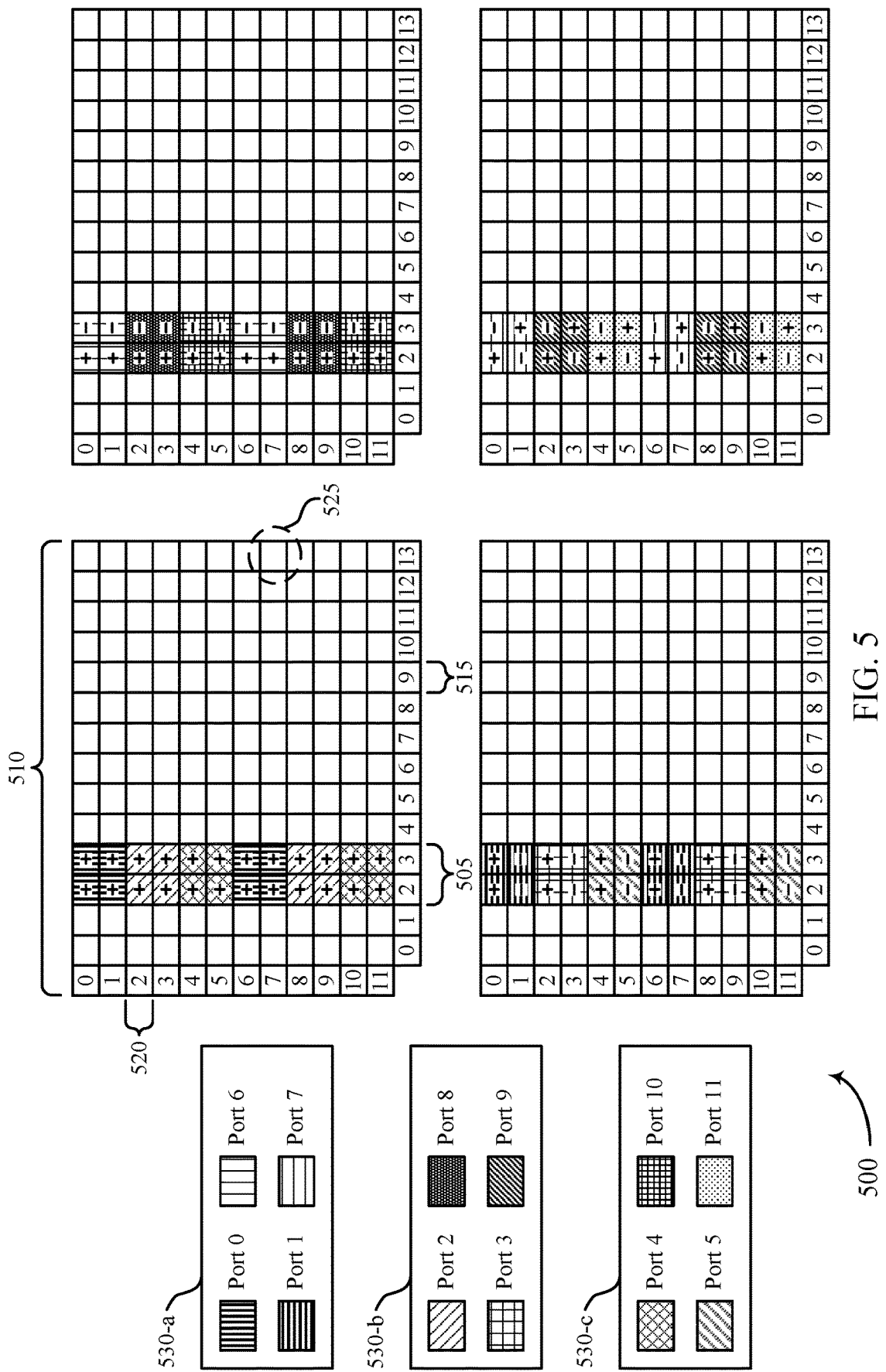
FIG. 5 illustrates an example resource configuration that supports non-uniform DMRS bundling in accordance with aspects of the present disclosure.

FIG. 5 illustrates an example resource configuration 500 that supports non-uniform DMRS bundling in accordance with aspects of the present disclosure. The resource configuration 500 illustrates an example transmission scheme and frame structure design for communications in a wireless communications system, which may implement aspects of the wireless communications system 100 as described with reference to FIG. 1. The resource configuration 500 shows a set of DMRS resources 505 (e.g., a set time-frequency resources) and a mapping to a number of antenna ports that a base station may use to transmit DMRSs to a UE, which may be examples of the corresponding devices as described with reference to FIG. 1.

The example resource configuration 500 of FIG. 5 shows four orthogonal resource blocks 510. The four resource blocks 510 may be orthogonalized using an OCC (e.g., a length-4 OCC). As shown, each of the resource blocks 510 includes 14 symbols 515 in the time domain and 12 subcarriers 520 in the frequency domain. A number of resource elements 525 are shown in each resource block 510, where each resource element 525 is defined by one symbol 515 in the time domain and one subcarrier 520 in the frequency domain. While the resource configuration 500 shows the resource blocks 510 as including 14 symbols 515 and 12 subcarriers 520, it is to be understood that the resource configuration 500 is only one example, and the resource configuration 500 may be analogously applied to configure a DMRS pattern for a resource block 510 including any number of uniform or non-uniform symbols 515 and subcarriers 520.

The example resource configuration 500 of FIG. 5 shows DMRS resources 505 that are configured for transmitting and receiving DMRSs of a second type (e.g., Type 2) with a length of two symbols 515 (e.g., a double-symbol length), that is, a "double-symbol Type 2" DMRS configuration. According to the resource configuration 500, the base station may transmit DMRSs over the DMRS resources 505 using up to 12 antenna ports. As the example resource configuration 500 shows, the DMRS resources 505 occupy a third symbol 515 and a fourth symbol 515 (e.g., symbols 2 and 3) of each resource block 510. The resource configuration 500 shows DMRS resources 505 for a front-loaded DMRS pattern in each resource block 510. That is, the front-loaded DMRS pattern may be for an initial DMRS transmission within the resource blocks 510 using the DMRS resources 505 (e.g., an initial DMRS transmission of one or more DMRS transmissions). It is to be understood, however, that additional resource elements 525 of the resource blocks 510 may be allocated for additional DMRS transmissions subsequent to the DMRS resources 505 shown in the example resource configuration 500 of FIG. 5.

According to the double-symbol Type 2 DMRS configuration shown in the resource configuration 500, the base station may transmit DMRSs to the UE over the DMRS resources 505 using up to 12 antenna ports. As the resource configuration 500 shows, 12 antenna ports are mapped to resource elements 525 corresponding to consecutively numbered subcarriers 520 over two consecutive symbols 515. The DMRSs are thus transmitted using four resource elements 525 per port during the symbols 515 allocated for the DMRS resources 505. The antenna ports may be orthogonalized using a length-4 OCC, resulting in three CDM groups 530. The first CDM group 530-a includes antenna ports 0, 1, 6, and 7; the second CDM group 530-b includes antenna ports 2, 3, 8, and 9; and the third CDM group 530-*c* includes antenna ports 4, 5, 10, and 11. In this way, the antenna ports of each CDM group 530 may transmit using spatially separated frequency and time resources.

In some cases, the resource blocks 510 may be examples of the TTIs described herein. Techniques are provided herein for determining, configuring, and signaling a semi-static configuration for non-uniform DMRS bundling of multiple TTIs. For example, the base station may transmit a bundling configuration to the UE, where the bundling configuration may provide configurations for non-uniform bundles of TTIs (i.e., different bundles of the configuration may include different numbers of TTIs, and the different bundles may be configured accordingly). In the bundling configuration, the base station may configure parameters that are common across a bundle of TTIs, such as a common precoding, to coherently transmit the DMRSs in each of the TTIs of each respective bundle. Accordingly, the UE may assume that a common precoder is used to transmit the DMRSs across some or all of the data channels of each bundle. In this way, the UE may coherently filter the received DMRSs to perform channel estimation.

Figure 6A:
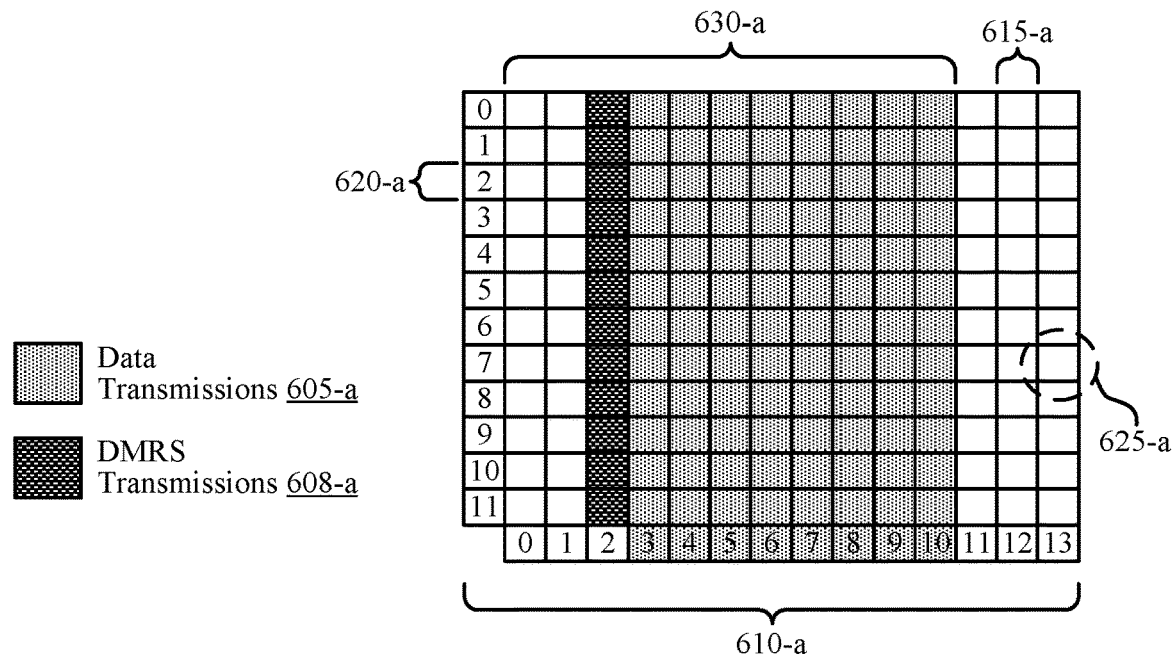
FIGS. 6A and 6B illustrate example resource configurations that support non-uniform DMRS bundling in accordance with aspects of the present disclosure.
Figure 6B:
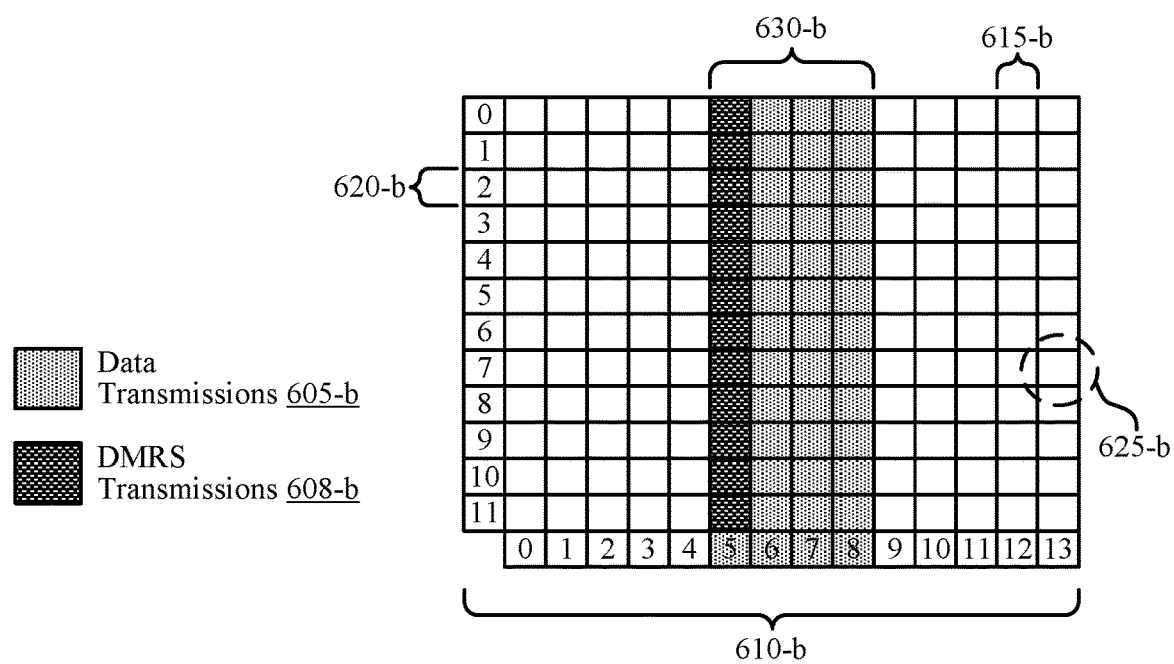

FIGS. 6A and 6B illustrate example resource configurations 600 that support non-uniform DMRS bundling in accordance with aspects of the present disclosure. The resource configurations 600 illustrate example transmission schemes and frame structure designs for communications in wireless communications systems, which may implement aspects of the wireless communications system 100 as described with reference to FIG. 1. The resource configurations 600 show first sets of resources (e.g., sets time-frequency resources) allocated for data transmissions 605 and second sets of resources allocated for DMRS transmissions 608 for a base station to communicate with a UE, which may be examples of the corresponding devices as described with reference to FIG. 1.

The example resource configurations 600 of FIGS. 6A and 6B show examples of different types of mappings for a data channel. As shown in the resource configurations 600, resource blocks 610 include 14 symbols 615 in the time domain and 12 subcarriers 620 in the frequency domain. Resource elements 625 are shown in the resource blocks 610, where each resource element 625 is defined by one symbol 615 in the time domain and one subcarrier 620 in the frequency domain. While the resource configurations 600 show the resource block 610 as including 14 symbols 615 and 12 subcarriers 620, it is to be understood that the resource configurations 600 are only example, and the resource configurations 600 may be analogously applied to map data channels of resource blocks 610 including any number of uniform or non-uniform symbols 615 and subcarriers 620.

FIG. 6A illustrates an example resource configuration 600-*a* showing an example of a first type of mapping for a data channel (e.g., type A). As shown in FIG. 6A, the resource configuration 600-*a* shows an allocation of resources for data transmissions 605-*a* from a fourth symbol 615-*a* (e.g., symbol 3) to an eleventh symbol 615-*a* (e.g., symbol 10) of the resource block 610-*a*. The data transmissions 605-*a* may include, for example, downlink transmissions using a PDSCH or uplink transmissions using a physical uplink shared channel (PUSCH). The resource configuration 600-*a* further shows an allocation of resources for one or more DMRS transmissions 608-*a* at a third symbol 615-*a* (e.g., symbol 2) of the resource block 610-*a*. For example, the base station may transmit to the UE one or more DMRS transmissions 608-*a* using the resources allocated for the DMRS transmission 608-*a* so that the UE may perform a channel estimation procedure using the received DMRS transmissions 608-*a*.

As similarly described above with reference to FIGS. 2 through 5, the resource configuration 600-*a* shows a resource allocation for a front-loaded DMRS pattern. That is, the front-loaded DMRS pattern may be for an initial DMRS transmission 608-*a* within the resource block 610-*a* using a first set of allocated resources. It is to be understood, however, that additional resources of the resource blocks 610-*a* may be allocated for additional DMRS transmissions 608 subsequent to the initial DMRS transmission 608-*a* shown in the resource configuration 600-*a*.

In some cases, a location of the initial DMRS transmission 608-*a* and locations of any subsequent DMRS transmissions 608 may be determined according to parameters configured by higher layers and a time-domain allocation of resources for the data transmissions 605-*a* (e.g., a time-domain resource allocation for a PDSCH). For example, the location of the initial DMRS transmission 608-*a* may be given by Ī. The value of Ī may be obtained, for example, from a look-up table according to a parameter $l_d$. The parameter given by $l_d$ may represent a duration 630-*a* including the data transmissions 605-*a* and the DMRS transmissions 608-*a*. In some cases, the duration 630-*a* given by $l_d$ may depend on the mapping type for the data transmissions 605-*a*.

The example resource configuration 600-*a* shown in FIG. 6A illustrates a first mapping type (e.g., a PDSCH mapping type A). According to the PDSCH mapping type A, $l_d$ may be defined as the duration 630-*a* between a first symbol 615-*a* of a TTI (e.g., a first symbol 615-*a* of the resource block 610-*a*) and a last symbol 615-*a* of the TTI including resources allocated for PDSCH. As shown in FIG. 6A, the duration 630-*a* that defines $l_d$ begins at a first symbol 615-*a* (e.g., symbol 0) of the resource block 610-*a* and ends at an eleventh symbol 615-*a* (e.g., symbol 10) of the resource block 610-*a*, where the eleventh symbol 615-*a* (symbol 10) is the last symbol 615-*a* of the resource block 610-*a* that is allocated for data transmissions 605-*a*.

FIG. 6B illustrates an example resource configuration 600-*b* showing an example of a second type of mapping for a data channel (e.g., type B). As shown in FIG. 6B, the resource configuration 600-*b* shows an allocation of resources for data transmissions 605-*b* from a sixth symbol 615-*b* (e.g., symbol 5) to a ninth symbol 615-*b* (e.g., symbol 8) of the resource block 610-*b*. The data transmissions 605-*b* may include, for example, downlink transmissions using a PDSCH or uplink transmissions using a PUSCH. The resource configuration 600-*b* further shows an allocation of resources for one or more DMRS transmissions 608-*b* at the sixth symbol 615-*b* (symbol 5) of the resource block 610-*b*. As show by the resource configuration 600-*b*, the resource allocation for the DMRS transmission 608-*b* overlaps with the resource allocation for the data transmissions 605-*b*. As such, the base station may, for example, transmit to the UE one or more DMRS transmissions 608-*b* using the resources allocated for the DMRS transmission 608-*b* during the time resources allocated for data transmissions 605-*a*, for example, PDSCH communications. The UE may then perform a channel estimation procedure using the received DMRS transmissions 608-*b*.

As similarly described above with reference to FIGS. 2 through 6A, the resource configuration 600-*b* shows a resource allocation for a front-loaded DMRS pattern. That is, the front-loaded DMRS pattern may be for an initial DMRS transmission 608-*b* within the resource block 610-*b* using a first set of allocated resources. It is to be understood, however, that additional resources of the resource blocks 610-b may be allocated for additional DMRS transmissions 608 subsequent to the initial DMRS transmission 608-b shown in the resource configuration 600-b.

As described above with reference to FIG. 6A, a location of the initial DMRS transmission 608-b and locations of any subsequent DMRS transmissions 608 may be determined according to parameters configured by higher layers and a time-domain allocation of resources for the data transmissions 605-b. For example, the location of the initial DMRS transmission 608-b may be given by l, where the value of l may be obtained, for example, from a look-up table according to a parameter $l_d$. The parameter given by $l_d$ may represent a duration 630-b including the data transmissions 605-b and the DMRS transmissions 608-b. In some cases, the duration 630-b given by $l_d$ may depend on the mapping type for the data transmissions 605-b.

The example resource configuration 600-b shown in FIG. 6B illustrates a second mapping type (e.g., a PDSCH mapping type B). According to the PDSCH mapping type B, $l_d$ may be defined according to the number of symbols 615-b that include resources allocated for data transmissions (e.g., the symbols 615-b that include resources scheduled for PDSCH). As shown in FIG. 6B, the duration 630-b that defines $l_d$ begins at the sixth symbol 615-b (e.g., symbol 5) of the resource block 610-b and ends at the ninth symbol 615-b (e.g., symbol 8) of the resource block 610-b, which are the symbols 615-b that span the time resources allocated for data transmissions 605-b (e.g., PDSCH communications).

In some cases, the resource blocks 610 may be examples of the TTIs described herein. Techniques are provided herein for determining, configuring, and signaling a semi-static configuration for non-uniform DMRS bundling of multiple TTIs. For example, the base station may transmit a bundling configuration to the UE, where the bundling configuration may provide configurations for non-uniform bundles of TTIs (i.e., different bundles of the configuration may include different numbers of TTIs, and the different bundles may be configured accordingly). In the bundling configuration, the base station may configure parameters that are common across a bundle of TTIs, such as a common precoding, to coherently transmit the DMRSs in each of the TTIs of each respective bundle. Accordingly, the UE may assume that a common precoder is used to transmit the DMRSs across some or all of the data channels of each bundle. In this way, the UE may coherently filter the received DMRSs to perform channel estimation. Further, in some cases, the base station and the UE may be configured to implement different bundling techniques for use with different mapping types for data channels (e.g., for different PDSCH mapping types). For example, a first type of mapping for a data channel (e.g., PDSCH mapping type A) may provide a relatively larger resource allocation for data communications than a second type of mapping for a data channel (e.g., PDSCH mapping type B).

Figure 7:
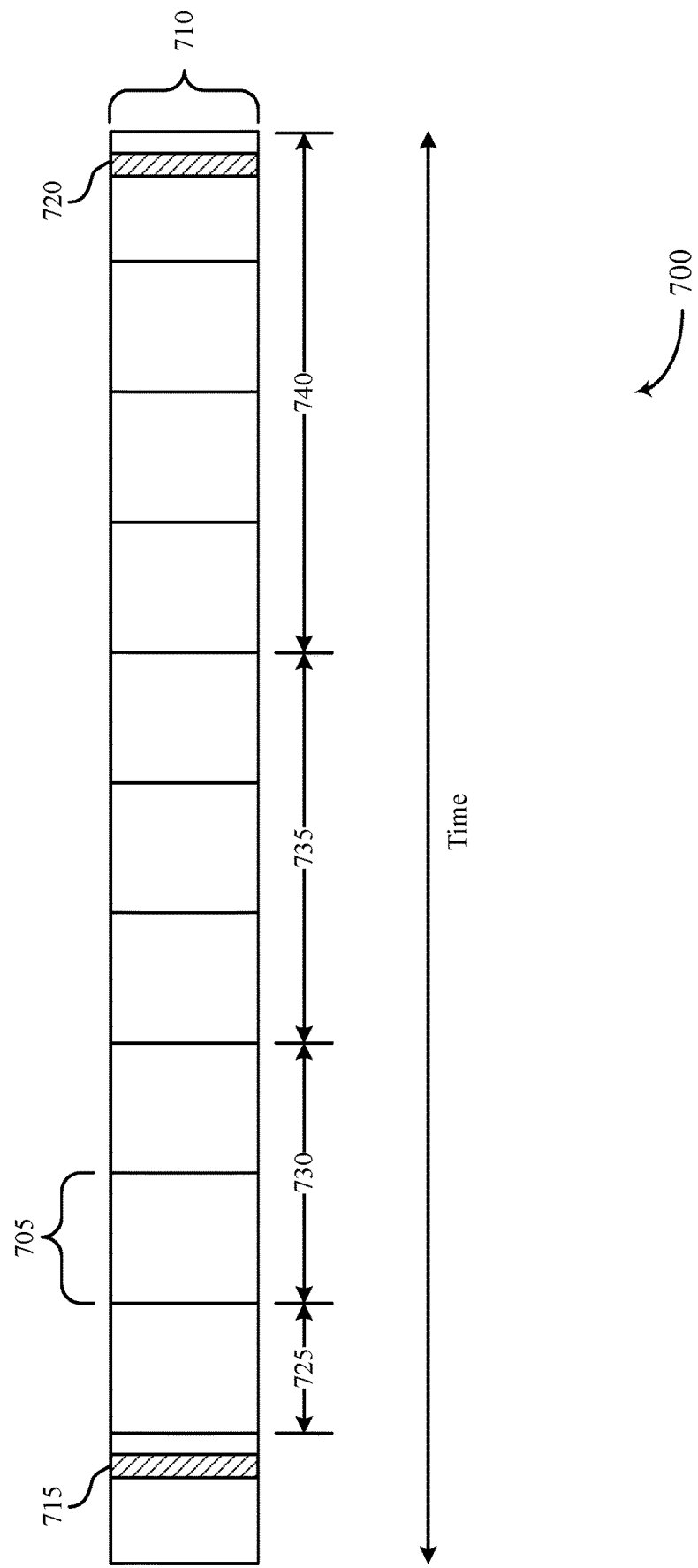
FIG. 7 illustrates an example of a transmission timeline that supports non-uniform DMRS bundling in accordance with aspects of the present disclosure.

FIG. 7 illustrates an example of a transmission timeline 700 that supports non-uniform DMRS bundling in accordance with aspects of the present disclosure. In some examples, the transmission timeline 700 may implement aspects of the wireless communications system 100 as described with reference to FIG. 1. In some examples, the transmission timeline 700 may be configured according to aspects of the resource configurations as described with reference to FIGS. 2 through 6. The transmission timeline 700 illustrates procedures for semi-static and non-uniform bundling of one or more TTIs 705 to facilitate communicating DMRSs between a base station and a UE, which may be examples of the corresponding devices as described with reference to FIG. 1.

The transmission timeline 700 shows a channel 710 including a series of multiple TTIs 705. The TTIs 705 may include, for example, any type of scheduling units for wireless communications, such as slots, mini-slots, a combination of slots and mini-slots, frames, subframes, symbol groups, and the like. The example transmission timeline 700 of FIG. 7 shows 11 TTIs 705, but it is it be understood that the techniques described herein may be similarly applied across any greater or lesser number of TTIs 705.

The base station and the UE may communicate uplink and downlink transmissions during each of the TTIs. For example, during one or more of the TTIs 705, the base station may transmit control signaling (via, e.g., DCI, RRC signaling, etc.) and downlink data transmissions (e.g., in a PDSCH) to the UE. Further, the TTIs 705 of the transmission timeline 700 may include resource blocks and/or PRBs, or implement aspects thereof, as described with reference to FIGS. 1 through 6. For example, the TTIs 705 may include one or more resource blocks implementing different types of mapping, for example, for a resource block including data transmissions over a PDSCH, the resource block may implement a PDSCH mapping type A or a PDSCH mapping type B, as described with reference to FIGS. 6A and 6B, respectively.

In some cases, during one or more of the TTIs 705, the base station may transmit to the UE reference signals associated with the data transmissions, such as DMRSs. In some cases, the base station may communicate the DMRSs according to a pattern (e.g., a DMRS pattern) that may specify, for example, one or more of: a set of parameters defining a resource allocation of time, frequency, and spectral resources for the DMRSs, a multiplexing scheme and/or an antenna port mapping for the DMRSs in the frequency, time, and code domain, a scrambling code to be applied to the DMRSs, and the like. In some cases, the pattern for communicating the DMRSs may be configured according to one or more of the DMRS configurations as described herein, for example, according to a Type 1 or a Type 2 configuration and the like, as described with reference to FIGS. 2 through 5. The UE may use DMRSs to estimate channel characteristics (e.g., via channel quality measurements) of the channel 710 (or channels) over which the base station and the UE communicate. The UE may then use the estimated channel characteristics to perform demodulation and/or decoding of transmissions communicated over the estimated channel 710.

In some cases, the UE may be configured to transmit one or more reference signals (e.g., SRSs) to the base station that the base station may use to perform downlink channel estimation. Downlink channel estimation may enable the base station to maintain reliable channel conditions, which may, for example, help the base station to configure communications with the UE to reduce latency, to avoid interference, and to meet reliability requirements (e.g., to satisfy a block error rate (BLER) requirement). In some cases, the UE may periodically transmit the SRSs to the base station. As shown in the transmission timeline 700, the UE may transmit a first SRS 715 to the base station during an initial TTI 705 of the transmission timeline 700. Following a certain period (e.g., according to a configured periodicity), the UE may transmit a second SRS 720 to the base station. As shown in the transmission timeline 700, the UE may transmit the second SRS 720 to the base station in an eleventh TTI 705 of the transmission timeline 700, for example, according to an example periodicity of 10 (specifically, 10 times the duration or average duration of the TTIs 705).

The base station may perform downlink channel estimation using the first SRS 715 and the second SRS 720 received from the UE. The base station may use downlink channel estimates to determine a downlink precoding for the estimated channel conditions, identify degrading channels (e.g., such that the base station may determine a new channels should be used for subsequent communications), and the like. For example, the base station may determine a precoding for a transmission beam that the base station may use to transmit the DMRSs to the UE. For example, the base station may determine a precoding setting to apply based on the channel conditions that the base station estimated based on one or more received SRSs (e.g., the first SRS 715).

After receiving the first SRS 715, for example, the base station may communicate with the UE as described herein over each of the TTIs 705 until the base station receives the second SRS 720. For example, the base station may transmit one or more DMRSs to the UE in each of the TTIs 705. As described herein, the base station may apply a determined precoding to the DMRS transmissions (e.g., the precoding determined based on the first SRS 715). In some cases, the base station may determine that different precoding (e.g., by different precoders) may provide relative improvements for different TTIs 705 along the transmission timeline 700. Accordingly, techniques are provided herein for determining, configuring, and signaling a semi-static configuration for non-uniform DMRS bundling. For example, the base station may transmit a bundling configuration to the UE, where the bundling configuration may configure parameters (e.g., a DMRS configuration including, e.g., a precoding parameter) for communicating DMRSs according to one or more bundles of one or more TTIs 705. In some cases, the base station may signal the bundling configuration to the UE via RRC signaling.

The bundling configuration may provide configurations for non-uniform bundles of TTIs 705 (i.e., different bundles of the configuration may include different numbers of TTIs 705, and the different bundles may be configured accordingly). For example, the bundling configuration may configure a bundling sequence that defines an order for multiple bundles and a number of TTIs 705 for each respective bundle. The bundling configuration for non-uniform bundles may further be semi-static, in that the base station may configure, in some cases by signaling a single bundling configuration, different parameters for communicating the DMRSs according to each of the different bundles. For example, the base station may indicate, in the bundling configuration transmitted to the UE, a different precoding for each of multiple bundles of TTIs 705 between the first SRS 715 and the second SRS 720.

The illustrative example of the transmission timeline 700 of FIG. 7 shows an example bundling sequence including four bundles, where each bundle includes a different number of TTIs 705. For example, according to the bundling sequence, a first bundle 725 may include one TTI 705 (i.e., being a "bundle" of one), a second bundle 730 may include the next two TTIs 705, a third bundle 735 may include the next three TTIs 705 following the second bundle 730, and a fourth bundle 740 may include the next four TTIs 705 following the third bundle 735. According to this bundling sequence, the base station may relatively more effectively extrapolate an optimal precoder for the TTIs 705 that more closely follow the first SRS 715, based on which the base station performed channel estimation to determine updated precoding settings. Thus, the base station may assign precoders more relatively rapidly for the TTIs 705 that follow the first SRS more closely in time. After some time, such as for the later TTIs 705 in the sequence, the channel estimates that the base station obtained based on the first SRS 715 will become older, and thus may be less accurate due to any intervening changes in channel conditions. Thus, the sequence configures relatively longer bundles including more TTIs 705 for the bundles that are later in the sequence, which may provide processing gains due to the consistent configuration across several TTIs 705.

It is to be understood that bundling sequence illustrated by the transmission timeline 700 (a bundling sequence of {1, 2, 3, 4}) is only one example. In alternative examples, according to the described semi-static non-uniform bundling techniques, the base station may determine any number of varied bundling sequences including different bundle sizes, different numbers of TTIs 705, different overall lengths, and so on. For example, another bundling sequence given by {1, 1, 1, R} may include four bundles of, respectively, one TTI 705, one TTI 705, one TTI 705, and a final bundle including all of the remaining TTIs 705 before the next SRS transmission. This bundling sequence may relatively more aggressively update a configuration for DMRSs (e.g., a precoding for communicating the DMRSs) at the beginning of a frame, for example, in situations in which the base station may expect unstable conditions to stabilize relatively quickly. A further example bundling sequence given by {2, 4, 8, 16 . . . } may include four or more bundles of, respectively, two TTIs 705, four TTIs 705, eight TTIs 705, sixteen TTIs 705, and so on. This bundling sequence provides a gradual ramp to progressively increase a bundling size, for example, in situations in which the base station may expect that it may not receive the following SRS transmission until a relatively longer time.

In some cases, the base station may determine a reference time (which may alternatively be referred to as a reference point) at which to begin a bundling sequence, or based on which a start of the bundling sequence may be determined. That is, the reference time may coincide with the first TTI 705 of the first bundle 725, for example, at a first DMRS transmission in the first TTI 705. Alternatively, the reference time may define a point with reference to which the sequence of bundled TTIs 705 may be defined. Several techniques are provided herein that may be utilized to determine, define, and/or configure the reference time for the bundling sequence.

According to a first technique, the bundling sequence may be defined with respect a latest transmission of a certain reference signal, for example, a latest transmission of an SRS that is tagged as an "antenna switching" SRS. The "antenna switching" SRS may be a type of SRS that is configured for downlink channel state information (CSI) acquisition. The base station may use the received "antenna switching" SRSs to measure a downlink channel and accordingly determine a precoder for communications using on the downlink channel. When the UE transmits the "antenna switching" SRS, the immediately following transmissions (e.g., DMRS transmissions) in the first TTI 705 of the first bundle 725 may follow the configured bundling sequence.

The transmission timeline 700 of FIG. 7 shows an example of the first technique. As transmission timeline 700 illustrates, the UE may transmit the first SRS 715 to the base station (here, e.g., configured as an "antenna switching" SRS). According to the first technique, this transmission is defined as the reference time for beginning the bundling sequence. Accordingly, the UE may operate according to a bundling configuration (e.g., as the UE may have received from the base station, e.g., via RRC signaling) and begin following the bundling sequence to communicate with the base station. Similarly, the base station may also begin following the bundling sequence when the UE transmits the first SRS 715, and the base station may transmit an initial DMRS to the UE in the first TTI 705 of the first bundle 725. The UE and base station may continue to follow the configured bundling sequence, as shown by the transmission timeline 700.

Additionally or alternatively, in a second technique, the base station may configure the UE with an offset (e.g., a delay) to be applied before the reference time at which the UE may begin the configured bundling sequence. The offset may define a duration of time for the UE to wait before applying the start of the bundling sequence. The base station may configure the offset, for example, as a number of slots (i.e., a number of TTIs 705) and/or a number of symbols within a TTI 705. In some cases, the base station may configure the offset to allow itself a duration of time to use as processing time before beginning the bundled communications.

In some cases, the offset may be defined with reference to a latest SRS transmission (i.e., the reference time would be at the point in time at the end of the duration of the offset, where the offset begins when the UE transmits an SRS). Alternatively, the offset may be defined with reference to a beginning of a frame. For example, in some cases the base station may not transmit any downlink information to the UE at the beginning of a frame (e.g., the base station may not transmit a PDSCH). In such cases, the UE may begin the offset from a start of the frame, for example, when the base station transmits DCI or an RRC command to the UE that initially configures the bundling configuration.

In some cases, depending on the indicated duration of the offset, the bundling sequence may begin, for example, in the middle of the time between two SRS transmissions (e.g., a relatively longer duration of time from a next SRS that the base station may use for channel estimation). In such cases, the base station may transmit a higher proportion of downlink data (e.g., over PDSCH). In some cases, before the end of the offset (e.g., in cases in which the offset ends relatively far from the nearest SRS transmission), the UE may operate without a bundling configuration, for example, according to a per-TTI 705 configuration or other legacy procedures. Alternatively, the base station may have previously configured the UE with an older bundling configuration. In such cases, the UE may apply the older bundling configuration until the end of the offset (thus, e.g., not immediately resetting and/or updating upon transmitting an SRS), at which time the UE may switch to an updated bundling configuration.

Additionally or alternatively, in a third technique, the base station may configure the UE to apply the bundling sequence after a first data transmission (e.g., a first PDSCH) is received following the UE's latest SRS transmission. For example, according to the third technique, the UE may transmit the first SRS 715, as shown in the transmission timeline 700, but then wait to receive a PDSCH from the base station. Once the UE receives the PDSCH, the UE may begin following the configured bundling sequence to communicate with the base station over the bundled TTIs 705. In some cases, this may provide the base station with a flexible duration of time to use as processing time before beginning the bundled communications (i.e., the base station determines when to begin the bundling sequence by transmitting the PDSCH to the UE).

Additionally or alternatively, in a fourth technique, the base station may first configure the UE with multiple non-uniform bundling sequences, and the base station may later transmit signaling to the UE that indicates to the UE which of the multiple sequences to apply. For example, the base station may configure the UE (via, e.g., RRC signaling) with a first bundling sequence given by $\{1, 2, 4, 8\}$ and a second bundling sequence given by $\{2, 4, 16\}$. Then, a time after configuring the UE with the first and second bundling sequences, the UE may transmit control signaling (e.g., the first DCI in a PDSCH) to the UE that triggers the UE to select either the first bundling sequence or the second bundling sequence, as the base station may have determined to be preferable at that time.

For example, in some cases, the base station may determine to start the bundling sequence at a relatively large distance from a last SRS transmission. In such cases, channel conditions may have changed enough such that the base station is unlikely to rapidly update a precoding, and thus a bundle of a single TTI 705 may not be useful. Thus, in this case, the base station may opt to signal to the UE to apply the second bundling sequence given by $\{2, 4, 16\}$. This may additionally allow the base station and UE to conserve processing power by eliminating one extra transition between different bundling configurations, Conversely, in cases in which the base station determines to start the bundling sequence at a relatively close distance to a last SRS transmission, the base station's previous channel estimations based on the last SRS may still be useful for updating its precoders. Thus, in these cases, the base station may opt to signal to the UE to apply the first bundling sequence given by $\{1, 2, 4, 8\}$.

In some cases, when the base station have signaled multiple bundling configurations to the UE according to the fourth technique, the selection of the first bundling sequence or the second bundling sequence may occur implicitly, for example, based on the SRS transmission resources. In some cases, certain SRS resource configurations may be implicitly associated with a specific bundling sequence. For example, if the UE transmits SRS every 15 TTIs 705, an association may be configured that the UE and the base station may implicitly apply. For example, the above first bundling sequence given by $\{1, 2, 4, 8\}$ may be associated with this SRS resource allocation over the above second bundling sequence given by $\{2, 4, 16\}$, because, in this example situation, the first bundling sequence may be preferable to the second bundling sequence in many or most cases. Through such an implicit association, the base station and UE may conserve spectral resources and processing power by eliminating at least one transmission that is not used.

Additionally or alternatively, in a fifth technique, the reference time at which to begin the bundling sequence may be defined with respect to a boundary of a frame. For example, as similarly described above with respect to the second technique, the reference time may be at the start of a frame when the base station transmits DCI or an RRC command to the UE to initially configure the bundling configuration. In some cases, whereas aligning the reference time with an SRS transmission may provide correspondence between a bundling pattern and channel requirements, aligning the reference time with, for example, the frame boundary may be relatively simpler (e.g., using relatively simpler processing operations).

Additionally or alternatively, in a sixth technique, the base station may transmit an activation command (e.g., a trigger) to the UE via higher layer signaling, the activation command signaling to the UE to apply a specific configuration at a specific TTI 705. For example, the base station may transmit to the UE a MAC control element (CE) command to apply a specific bundling configuration, or a specific precoding, or a similar configuration parameter to a specific TTI 705. As compared to, for example, RRC signaling, which may be more flexibly applied, the MAC CE command provides an explicit command. Similarly, the base station may transmit to the UE a MAC CE command to, at a specific point, begin an offset before beginning a bundling sequence (e.g., also configured by the MAC CE command or other higher layer signaling) to communicate with the base station over bundled TTIs 705. Through this explicit signaling, the base station may more dynamically change the bundling configuration that the UE is to follow, for example, in situations of rapidly or unexpectedly changing channel conditions (e.g., to quickly change a precoding for the DMRSs to account for the changed channel conditions).

In some cases, the UE may report to the base station its capability to support one or more of (or each of) the above described bundling techniques and/or techniques for determining the reference time at which to begin the bundling sequence. For example, the UE may be configured to support a first technique but not a second technique for determining the reference time (e.g., due to hardware and/or software capability of the UE). The UE may transmit a capability message to the base station indicating that the UE supports the first technique and/or that the UE does not support the second technique. Based on the capabilities of the UE indicated in the capability message, the base station may configure the UE for bundling using the features that the UE supports, and may not configure the UE to use bundling features that the UE does not support.

In some cases, the base station and/or a higher level rule specified by a wireless communications system may define certain ones of the above described bundling techniques and/or techniques for determining the reference time to be used for certain systems and/or certain situations. In some cases, the base station and the UE may be configured to implement different bundling techniques for use with different mapping types for data channels (e.g., for different PDSCH mapping types). For example, a first type of mapping for a data channel (e.g., PDSCH mapping type A) may provide a relatively larger resource allocation for data communications than a second type of mapping for a data channel (e.g., PDSCH mapping type B), as described with reference to FIGS. 6A and 6B, respectively. A data channel mapped using PDSCH mapping type B may have a relatively small amount of resources allocated for data communications, and so an amount of time (and thus a number of TTIs 705) between SRS transmissions may be relatively small. Thus, bundling multiple TTIs 705 for communications over the data channel mapped using PDSCH mapping type B may not provide as substantial of a benefit as bundling TTIs 705 for communications over a data channel mapped using PDSCH mapping type A. Because of the larger resource allocation for data communications over data channels mapped using PDSCH mapping type A, bundling may be used to effectively achieve the efficiency and processing gains described herein. As such, the base station and the UE may be configured to implement more of the described bundling techniques for use with data communications over data channels mapped using PDSCH mapping type A, while the base station and the UE may be configured to support fewer of the described bundling techniques for use with data communications over data channels mapped using PDSCH mapping type B.

Similarly, in some cases, the base station and the UE may be configured to implement different bundling techniques for use with different types of wireless communications systems. For example, some wireless communications systems may implement low latency wireless communications, such as ultra-reliable, low latency communications (URLLC). In some cases, URLLC applications may have strict latency and reliability requirements. Because of the relatively stringent reliability requirements for URLLC wireless communications systems, the base station may more conservatively select precoders for communicating using the bundling techniques described herein. Further, in some cases, the base station may select a different bundling sequence for communications for URLLC applications. For example, the base station may determine to use a bundling sequence with relatively longer bundles including more TTIs 705, so that transitions to new precoders occur less frequently and a low error rate can be maintained to comply with the URLLC applications' reliability requirements.

In contrast, some wireless communications systems may implement eMBB communications, which may support increased data rates and enhanced coverage for cell-edge communications. As compared to URLLC wireless communications systems, a wireless communications systems implementing eMBB may tolerate a relatively higher error rate. As such, the base station may more aggressively select precoders for communicating using the bundling techniques described herein. Similarly, in some cases, the base station may more aggressively select bundling sequences for communications for eMBB applications. For example, the base station may determine to use a bundling sequence with relatively shorter bundles including fewer TTIs 705 to achieve the efficiency and processing gains provided by the described bundling techniques.

In some cases, an SRS transmission may not be successfully communicated from the UE to the base station. For example, the SRS may encounter interference or a collision that prevents the base station from successfully receiving it. However, as described herein, in some cases, the reference time at which to begin the bundling sequence may be defined according to the SRS transmission. Thus, in some cases in which the SRS is not successfully communicated from the UE to the base station, the UE and the base station may associate the reference time with the SRS transmission as it was configured (e.g., the reference point may still be set to the time resources with which the UE transmitted the SRS). In such cases, the base station may still send transmission to the UE using bundled TTIs 705. However, because the base station did not successfully receive the SRS, the base station will not have updated channel estimates that the base station would have performed using the SRS. Thus, the base station may use relatively more conservative precoding, bundling sequences, and the like, but may still realize at least some of the efficiency and processing gains provided by the described bundling techniques.

Alternatively, in some cases in which the SRS is not successfully communicated from the UE to the base station, the UE and the base station have been configured to associate the reference time with the actual transmission of the SRS. In such cases, the base station may not associate the reference time with SRS transmission, as the base station never received the transmitted SRS. Thus, the base station would not transmit bundled communications. Accordingly, in such cases, the UE may also determine not to apply bundling for the subsequent TTIs 705, until, for example, the UE transmits a subsequent SRS and the base station correctly receives the subsequent SRS transmission. Similarly, if the UE detects that at least one symbol of an associated SRS occasion is dropped, the UE may determine not to apply bundling for any subsequent TTIs 705, until, for example, the UE transmits a subsequent SRS and the base station correctly receives the subsequent SRS transmission.

Further, in some cases in which the reference time at which to begin the bundling sequence is defined based on the SRS transmission, the base station may only partially receive the SRS. Thus, the SRS would only function to sound the particular PRBs on which the base station actually received the SRS. In such cases, the base station may determine to only bundle downlink transmissions (e.g., DMRSs) using the same frequency resources corresponding to the PRBs actually sounded by the correctly received portion of the SRS. The base station may similarly transmit signaling to the UE to configure the UE to apply the previously configured bundling only for the resources for receiving the downlink transmissions corresponding to the PRBs actually sounded by the correctly received portion of the SRS. Additionally or alternatively, in such cases, the base station may determine apply the bundling across an entire radio frequency spectrum of the channel 710.

Figure 8:
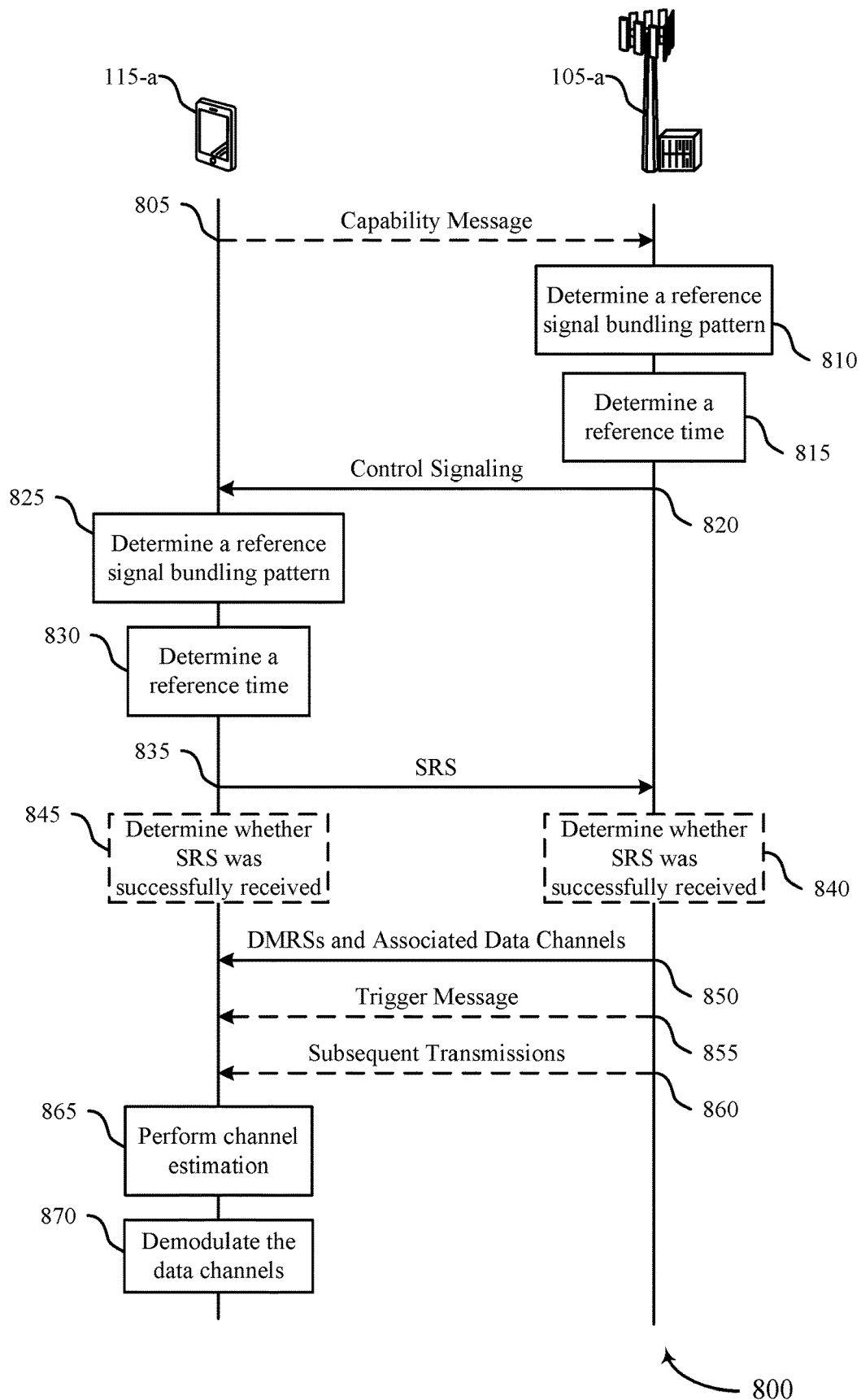
FIG. 8 illustrates an example of a process flow that supports non-uniform DMRS bundling in accordance with aspects of the present disclosure.

FIG. 8 illustrates an example of a process flow 800 that supports non-uniform DMRS bundling in accordance with aspects of the present disclosure. In some examples, the process flow 800 may be implemented by aspects of wireless communications system 100, as described with reference to FIG. 1. The process flow 800 may include a base station 105-*a* and a UE 115-*a*, which may be examples of the corresponding devices described with reference to FIGS. 1 through 7. Alternative examples of the following may be implemented, where some steps are performed in a different order than described or are not performed at all. In some cases, steps may include additional features not mentioned below, or further steps may be added.

At 805, the UE 115-*a* may transmit to the base station 105-*a*, and the base station 105-*a* may receive from the UE 115-*a*, a capability message indicating a capability of the UE to support a reference signal bundling pattern (e.g., a bundling sequence) for receiving one or more DMRSs. The UE 115-*a* may report to the base station 105-*a* in the capability message its capability to support bundling techniques and/or techniques for determining a reference time at which to begin a bundling sequence. For example, the UE 115-*a* may be configured to support a first technique but not a second technique for determining the reference time (e.g., due to hardware and/or software capability of the UE 115-*a*). Based on the capabilities of the UE 115-*a* indicated in the capability message, the base station 105-*a* may configure the UE 115-*a* for bundling using the features that the UE 115-*a* supports, and may not configure the UE 115-*a* to use bundling features that the UE 115-*a* does not support.

At 810, the base station 105-*a* may determine a reference signal bundling pattern (e.g., a bundling sequence) for transmitting a plurality of DMRSs and a plurality of associated data channels across a plurality of TTIs, where the reference signal bundling pattern may indicate that one or more of the plurality of TTIs are bundled as a plurality of reference signal bundled TTIs. In some cases, at least two of the plurality of reference signal bundled TTIs may have different durations (e.g., according to a non-uniform bundling pattern).

In some cases, the reference signal bundling pattern may indicate that the base station 105-*a* is to apply a same precoder for each bundled TTI of the plurality of reference signal bundled TTIs. Additionally or alternatively, the reference signal bundling pattern may be based on a type of wireless communications system in which the base station 105-*a* and the UE 115-*a* are communicating. For example, the type of wireless communications system may be eMBB and/or URLLC.

In some cases, the reference signal bundling pattern may be based on a channel type in which the plurality of DMRSs are to be communicated between the base station 105-*a* and the UE 115-*a*. In some cases, the channel type may include one of a first type of PDSCH (e.g., PDSCH mapping type A) or a second type of PDSCH (e.g., PDSCH mapping type B). In some cases, the first type of PDSCH may be associated with communicating an initial DMRS of the plurality of DMRSs based on a starting time of a set of one or more TTIs. In some cases, the second type of PDSCH may be associated with receiving the initial DMRS based on a starting time of an allocation for the scheduled resources.

At 815, the base station 105-*a* may determine a reference time at which to transmit an initial DMRS of the plurality of DMRSs during one of the plurality of reference signal bundled TTIs according to the reference signal bundling pattern. In some cases, the reference time may be determined based on a boundary of a set of one or more TTIs of the plurality of TTIs (e.g., a frame boundary).

At 820, the base station 105-*a* may transmit to the UE 115-*a*, and the UE 115-*a* may receive from the base station 105-*a*, control signaling indicating the reference signal bundling pattern that schedules resources for communicating, between the UE 115-*a* and the base station 105-*a*, the plurality of DMRSs and the plurality of associated data channels across the plurality of TTIs. In some cases, the control signaling may include an indication of an offset, where duration of the offset may begin following a latest SRS transmission, and the reference time may be determined to be a time at an end of the duration of the offset within the second TTI. Alternatively, the duration of the offset may begin at a beginning of the second TTI, and the reference time may be determined to be a time at an end of the duration of the offset within the second TTI. In some cases, the control signaling may include a first reference signal bundling pattern configuration and a second reference signal bundling pattern configuration (e.g., two or more different bundling configurations indicating different bundling sequences).

At 825, the UE 115-*a* may determine a reference signal bundling pattern (e.g., a bundling sequence) for receiving a plurality of DMRSs and a plurality of associated data channels across a plurality of TTIs, where the reference signal bundling pattern may indicate that one or more of the plurality of TTIs are bundled as a plurality of reference signal bundled TTIs. In some cases, at least two of the plurality of reference signal bundled TTIs may have different durations (e.g., according to a non-uniform bundling pattern).

In some cases, the reference signal bundling pattern may indicate that the UE 115-*a* is to use a same precoding to receive transmissions in each bundled TTI of the plurality of reference signal bundled TTIs (e.g., assume that a same precoding is applied at the transmitting base station 105-*a*). Additionally or alternatively, the reference signal bundling pattern may be based on a type of wireless communications system in which the base station 105-*a* and the UE 115-*a* are communicating. For example, the type of wireless communications system may be eMBB and/or URLLC.

In some cases, the reference signal bundling pattern may be based on a channel type in which the plurality of DMRSs are to be communicated between the base station 105-a and the UE 115-a. In some cases, the channel type may include one of a first type of PDSCH (e.g., PDSCH mapping type A) or a second type of PDSCH (e.g., PDSCH mapping type B). In some cases, the first type of PDSCH may be associated with communicating an initial DMRS of the plurality of DMRSs based on a starting time of a set of one or more TTIs. In some cases, the second type of PDSCH may be associated with receiving the initial DMRS based on a starting time of an allocation for the scheduled resources.

At 830, the UE 115-a may determine a reference time at which to receive an initial DMRS of the plurality of DMRSs during one of the plurality of reference signal bundled TTIs according to the reference signal bundling pattern. In some cases, the reference time may be determined based on a boundary of a set of one or more TTIs of the plurality of TTIs (e.g., a frame boundary).

At 835, the UE 115-a may transmit to the base station 105-a, and the base station 105-a may receive from the UE 115-a, an SRS during a first TTI, where the reference time may be determined to be within a second TTI, and the second TTI follows the first TTI. In some cases, the first TTI may immediately follow the second TTI, and the first TTI may include a latest transmission of the SRS. In some cases, transmitting the SRS may include transmitting the SRS on a set of PRBs, where each of the PRBs may include corresponding ones of the plurality of associated data channels. In some cases, the reference signal bundling pattern may apply to the PRBs of the associated data channel corresponding to the set of PRBs, and not to PRBs of the associated data channel not corresponding to the set of PRBs.

At 840, the base station 105-a may determine whether the base station 105-a received the SRS correctly. For example, the base station 105-a may determine that the SRS was not successfully received, where the reference signal bundling pattern may be based on determining that the SRS was not successfully received.

At 845, the UE 115-a may similarly determine whether the base station 105-a received the SRS correctly. For example, the base station 105-a may determine that the SRS was not successfully received, where the reference signal bundling pattern may be based on determining that the SRS was not successfully received. For example, in some cases, the base station 105-a may transmit an indication to the UE 115-a of whether the base station 105-a received the SRS correctly.

At 850, the base station 105-a may transmit to the UE 115-a, and the UE 115-a may receive from the base station 105-a, the plurality of DMRSs and the associated data channels according to the reference signal bundling pattern. In some cases, the base station 105-a may transmit to the UE 115-a, and the UE 115-a may receive from the base station 105-a, an initial data transmission after transmitting the SRS, and the reference time may be determined to be a time following the initial data transmission. In some cases, the initial data transmission may be communicated via a PDSCH.

At 855, the base station 105-a may transmit to the UE 115-a, and the UE 115-a may receive from the base station 105-a, a trigger message (e.g., an activation command), where the reference time may be determined based on the trigger message. In some cases, the trigger message may include an offset, and the reference time may be at a time following the offset. In some cases, the trigger message may be communicated in a MAC CE. In some cases, the base station 105-a may transmit to the UE 115-a, and the UE 115-a may receive from the base station 105-a, a further trigger message in a PDSCH after communicating the SRS, and the reference signal bundling pattern may be determined according to the first reference signal bundling pattern configuration or the second reference signal bundling pattern configuration based on the trigger message. In some cases, the trigger message may be received in PDSCH.

At 860, the base station 105-a may transmit to the UE 115-a, and the UE 115-a may receive from the base station 105-a, one or more subsequent transmissions according to an antenna switching procedure (e.g., a use case of antenna switching), where the antenna switching procedure may be based on the transmitted SRS (e.g., at 835). For example, the SRS that the UE 115-a may have transmitted at 835 may be an "antenna switching" SRS, which may be a type of SRS that is configured for downlink CSI acquisition. The base station 105-a may, for example, use the received "antenna switching" SRS to measure a downlink channel and accordingly determine a precoder and/or an antenna port mapping for the subsequent transmissions.

At 865, the UE 115-a may perform channel estimation based on the received plurality of DMRSs and the associated data channels. For example, the UE 115-a may estimate channel characteristics (e.g., via channel quality measurements) of wireless channels over which the base station 105-a and the UE 115-a communicate data.

At 870, the UE 115-a may demodulate the data channels based on performing channel estimation using the received plurality of DMRSs. Additionally or alternatively, the UE 115-a may the associated data channels.

Figure 9:
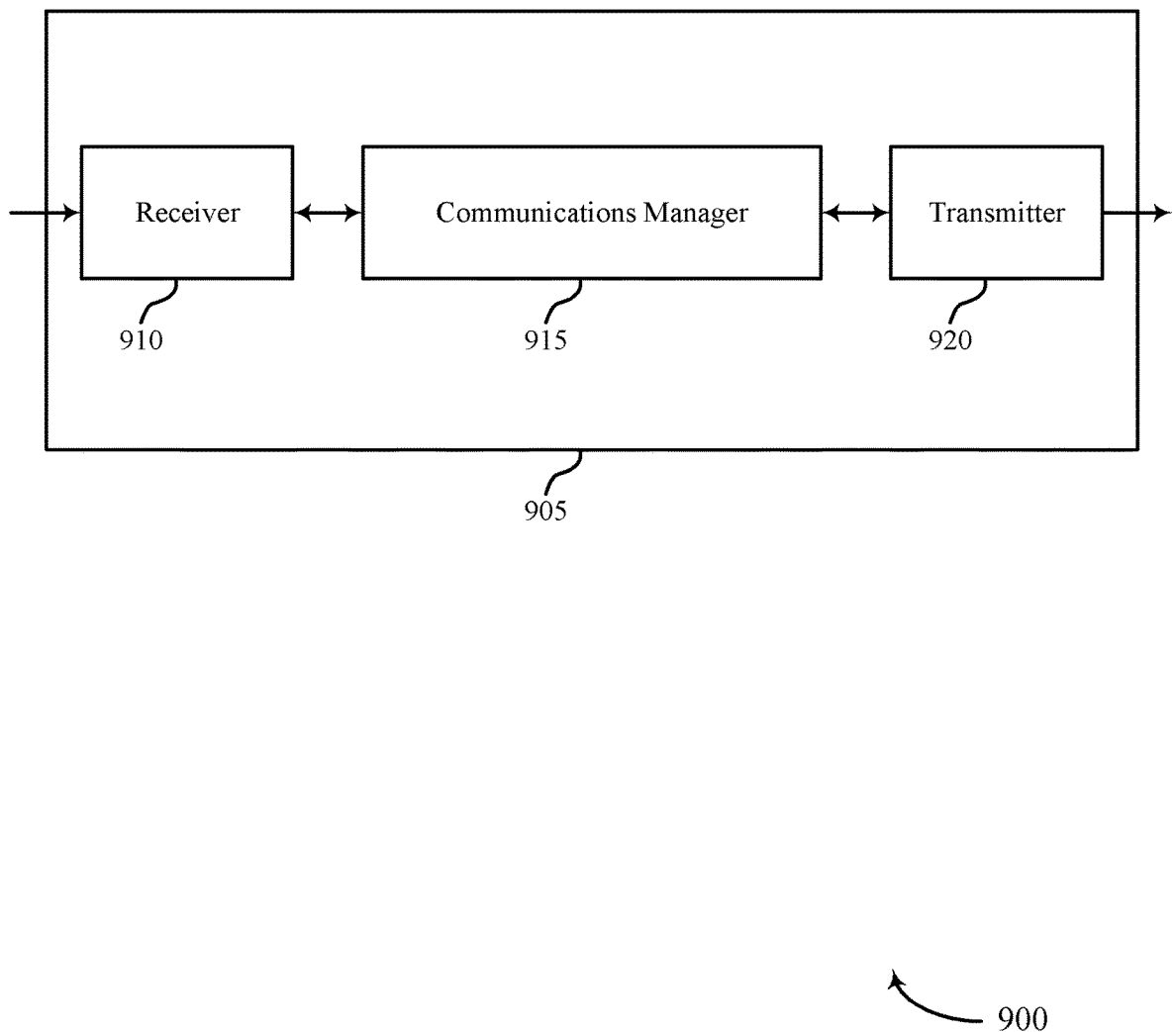
FIGS. 9 and 10 show block diagrams of devices that support non-uniform DMRS bundling in accordance with aspects of the present disclosure.

FIG. 9 shows a block diagram 900 of a device 905 that supports non-uniform DMRS bundling in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to non-uniform DMRS bundling, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive control signaling that schedules resources for receiving a set of DMRSs and a set of associated data channels across a set of TTIs, determine a reference signal bundling pattern for receiving the set of DMRSs and the set of associated data channels according to the control signaling, where the reference signal bundling pattern indicates that one or more of the set of TTIs are bundled as a set of reference signal bundled TTIs, at least two of the set of reference signal bundled TTIs having different durations, receive the set of DMRSs and the associated data channels according to the reference signal bundling pattern, and perform channel estimation based on the received set of DMRSs and the associated data channels. The communications manager 915 may be an example of aspects of the communications manager 1210 described herein. The actions performed by the communications manager 915 as described herein may be implemented to realize one or more potential advantages discussed herein. One implementation may allow a base station to transmit a bundling configuration to the device 905, where the bundling configuration may configure parameters (e.g., a precoding setting) for communicating DMRSs according to one or more non-uniform bundles of TTIs (i.e., different bundles of the configuration may include different numbers of TTIs, and the different bundles may be configured accordingly). For example, the bundling configuration may configure bundles near a first SRS transmission to be relatively shorter, and configure bundles that are later in the sequence to be relatively longer. Accordingly, the device 905 may assume that a common precoder is used to transmit the DMRSs across some or all of the data channels of each bundle. In this way, the device 905 may coherently filter the received DMRSs to improve the accuracy of its channel estimation procedures by jointly processing the DMRSs received in each bundle.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
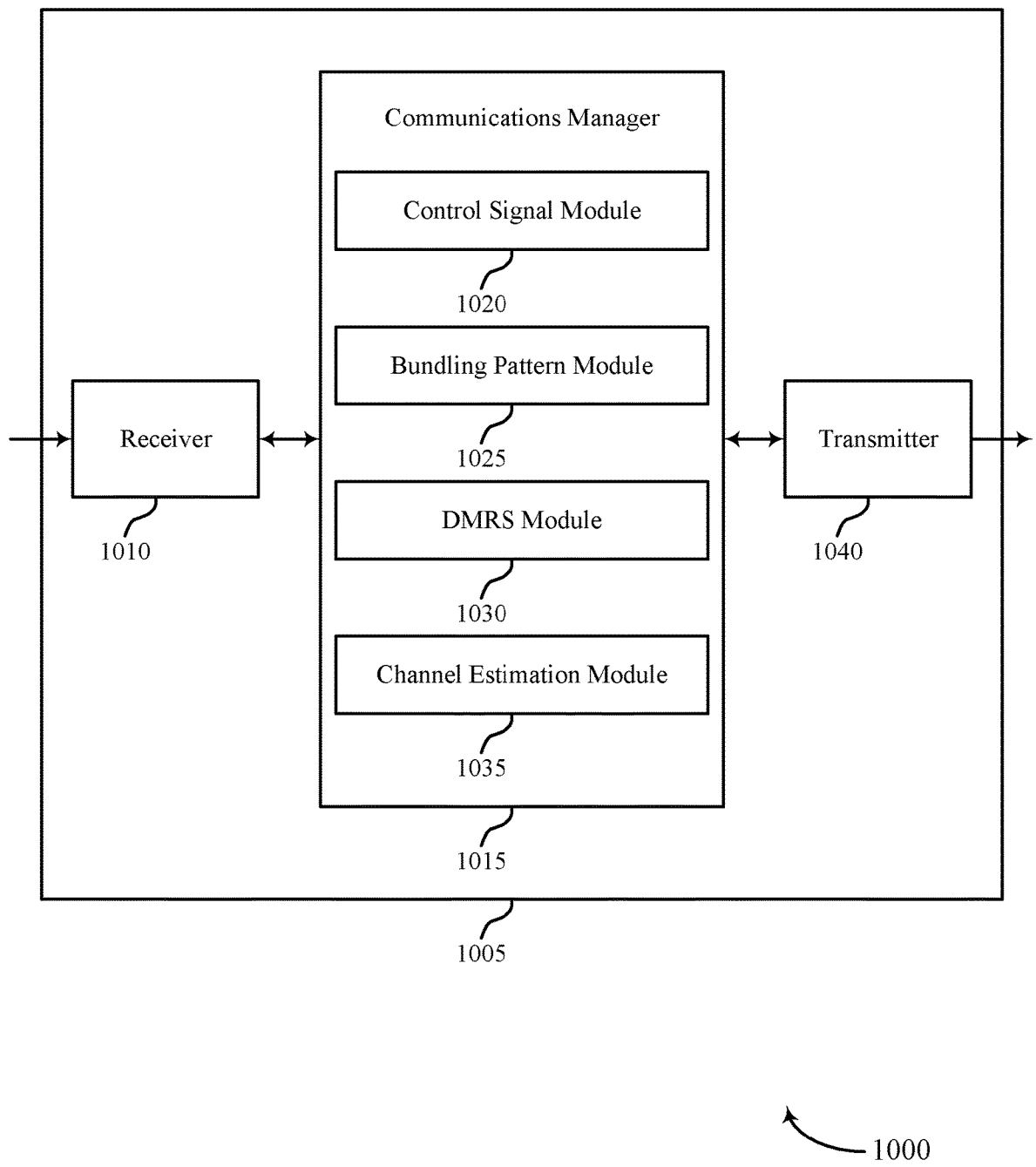

FIG. 10 shows a block diagram 1000 of a device 1005 that supports non-uniform DMRS bundling in accordance with aspects of the present disclosure. The device 1005 may be an example of aspects of a device 905, or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to non-uniform DMRS bundling, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a control signal module 1020, a bundling pattern module 1025, a DMRS module 1030, and a channel estimation module 1035. The communications manager 1015 may be an example of aspects of the communications manager 1210 described herein.

The control signal module 1020 may receive control signaling that schedules resources for receiving a set of DMRSs and a set of associated data channels across a set of TTIs.

The bundling pattern module 1025 may determine a reference signal bundling pattern for receiving the set of DMRSs and the set of associated data channels according to the control signaling, where the reference signal bundling pattern indicates that one or more of the set of TTIs are bundled as a set of reference signal bundled TTIs, at least two of the set of reference signal bundled TTIs having different durations.

The DMRS module 1030 may receive the set of DMRSs and the associated data channels according to the reference signal bundling pattern.

The channel estimation module 1035 may perform channel estimation based on the received set of DMRSs and the associated data channels.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
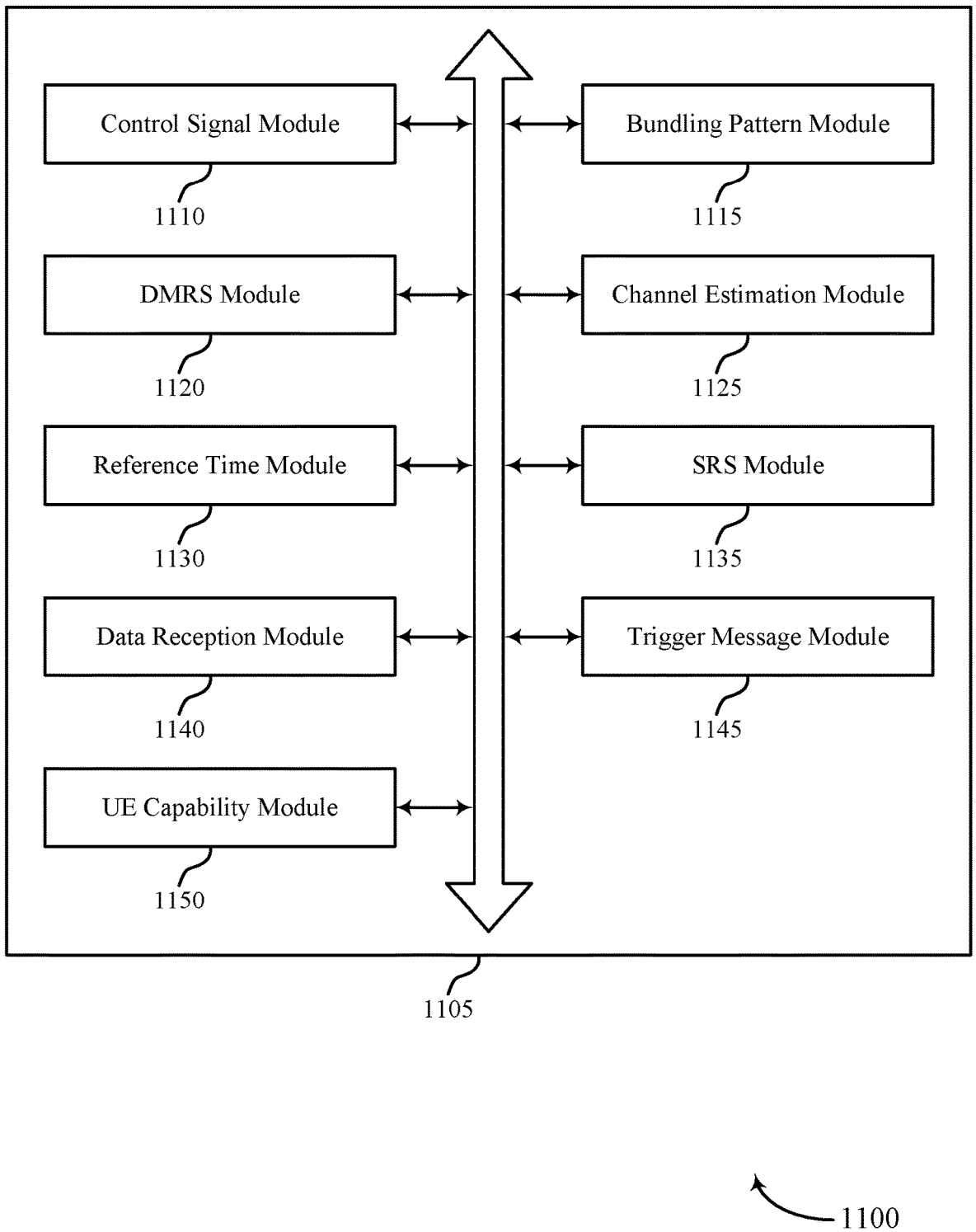
FIG. 11 shows a block diagram of a communications manager that supports non-uniform DMRS bundling in accordance with aspects of the present disclosure.

FIG. 11 shows a block diagram 1100 of a communications manager 1105 that supports non-uniform DMRS bundling in accordance with aspects of the present disclosure. The communications manager 1105 may be an example of aspects of a communications manager 915, a communications manager 1015, or a communications manager 1210 described herein. The communications manager 1105 may include a control signal module 1110, a bundling pattern module 1115, a DMRS module 1120, a channel estimation module 1125, a reference time module 1130, a SRS module 1135, a data reception module 1140, a trigger message module 1145, and a UE capability module 1150. Each of these modules may communicate, directly or indirectly, with one another (e.g., via one or more buses).

The control signal module 1110 may receive control signaling that schedules resources for receiving a set of DMRSs and a set of associated data channels across a set of TTIs.

The bundling pattern module 1115 may determine a reference signal bundling pattern for receiving the set of DMRSs and the set of associated data channels according to the control signaling, where the reference signal bundling pattern indicates that one or more of the set of TTIs are bundled as a set of reference signal bundled TTIs, at least two of the set of reference signal bundled TTIs having different durations. In some cases, the reference signal bundling pattern indicates that the UE is to use a same precoding to receive transmissions in each bundled TTI of the plurality of reference signal bundled TTIs (e.g., assume that a same precoding is applied at a transmitting base station). In some cases, the reference signal bundling pattern is based on a type of wireless communications system including the UE. In some cases, the type of wireless communications system is one or more of eMBB or URLLC. In some cases, the reference signal bundling pattern is based on a channel type in which the set of DMRSs are received. In some cases, the plurality of reference signal bundled TTIs may include a first reference signal bundled TTI and a second reference signal bundled TTI, the first reference signal bundled TTI including a first number of TTIs and second reference signal bundled TTI including a second number of TTIs, and where the first number of TTIs may be different from the second number of TTIs.

In some cases, the channel type includes one of a first type of PDSCH or a second type of PDSCH, and where the first type of PDSCH is associated with receiving an initial DMRS of the set of DMRSs based on a starting time of a set of one or more TTIs, and the second type of PDSCH is associated with receiving the initial DMRS based on a starting time of an allocation for the scheduled resources.

The DMRS module 1120 may receive the set of DMRSs and the associated data channels according to the reference signal bundling pattern. In some examples, the DMRS module 1120 may demodulate the data channels based on performing channel estimation using the received set of DMRSs.

The channel estimation module 1125 may perform channel estimation based on the received set of DMRSs and the associated data channels.

The reference time module 1130 may determine a reference time at which to receive an initial DMRS of the set of DMRSs during one of the set of reference signal bundled TTIs according to the reference signal bundling pattern. In some examples, the reference time module 1130 may receive an indication of an offset, where a duration of the offset begins following a latest SRS, and the reference time is determined to be a time at an end of the duration of the offset and within the second TTI. In some examples, the reference time module 1130 may receive an indication of an offset, where a duration of the offset begins at a beginning of the second TTI, and the reference time is determined to be a time at an end of the duration of the offset and within the second TTI. In some cases, the reference time is determined based on a boundary of a set of one or more TTIs of the set of TTIs. In some cases, the boundary of the set of one or more TTIs includes a frame boundary.

The SRS module 1135 may transmit a SRS during a first TTI, where the reference time is determined to be within a second TTI, the second TTI following the first TTI. In some examples, the SRS module 1135 may receive one or more subsequent transmissions using an antenna switching pattern, where SRS may be associated with an antenna switching procedure (e.g., a use case of antenna switching). In some cases, the first TTI immediately follows the second TTI, and the first TTI includes a latest transmission of the SRS.

In some examples, the SRS module 1135 may transmit a SRS. In some examples, the SRS module 1135 may determine that the SRS was not successfully received, where the reference signal bundling pattern is based on determining that the SRS was not successfully received.

In some examples, the SRS module 1135 may transmit a SRS on a set of PRBs, each of the PRBs including corresponding ones of the set of associated data channels, where the reference signal bundling pattern applies to the PRBs of the associated data channel corresponding to the set of PRBs, and not to PRBs of the associated data channel not corresponding to the set of PRBs.

The data reception module 1140 may receive an initial data transmission after transmitting the SRS, where the reference time is determined to be a time following the initial data transmission. In some cases, the initial data transmission is received in a PDSCH.

The trigger message module 1145 may receive a trigger message in a PDSCH after transmitting the SRS, and the reference signal bundling pattern is determined according to the first reference signal bundling pattern configuration or the second reference signal bundling pattern configuration based on the trigger message. In some examples, the trigger message module 1145 may receive a trigger message, where the reference time is determined based on the trigger message. In some cases, the trigger message is received in control information (e.g., DCI) in the PDSCH. In some cases, the trigger message further includes an offset, and the reference time is at a time following the offset. In some cases, the trigger message is received in a MAC CE. In some cases, the actions performed by the trigger message module 1145, included in the communications manager 1105, as described herein may facilitate the processor 1240, as described with reference to FIG. 12, to more efficiently cause the device to perform various functions. For example, the base station may signal multiple bundling configurations to the device, and the base station may signal to the device in the trigger message which of the bundling configurations that the device is to apply. In such cases, the base station may signal to the device to apply a bundling configuration that may be better suited for the particular situation. Additionally or alternatively, as described herein, a first bundling sequence may be associated to a particular allocation over a second bundling sequence for situations in which the preferred bundling sequence may be implicit. Through such an implicit association, the device may conserve spectral resources. This may reduce processing complexity for the processor of the device, and, by eliminating at least one unneeded transmission, may reduce processing power consumption for the processor.

The UE capability module 1150 may transmit a capability message indicating a capability of the UE to support the reference signal bundling pattern for receiving the set of DMRS s.

Figure 12:
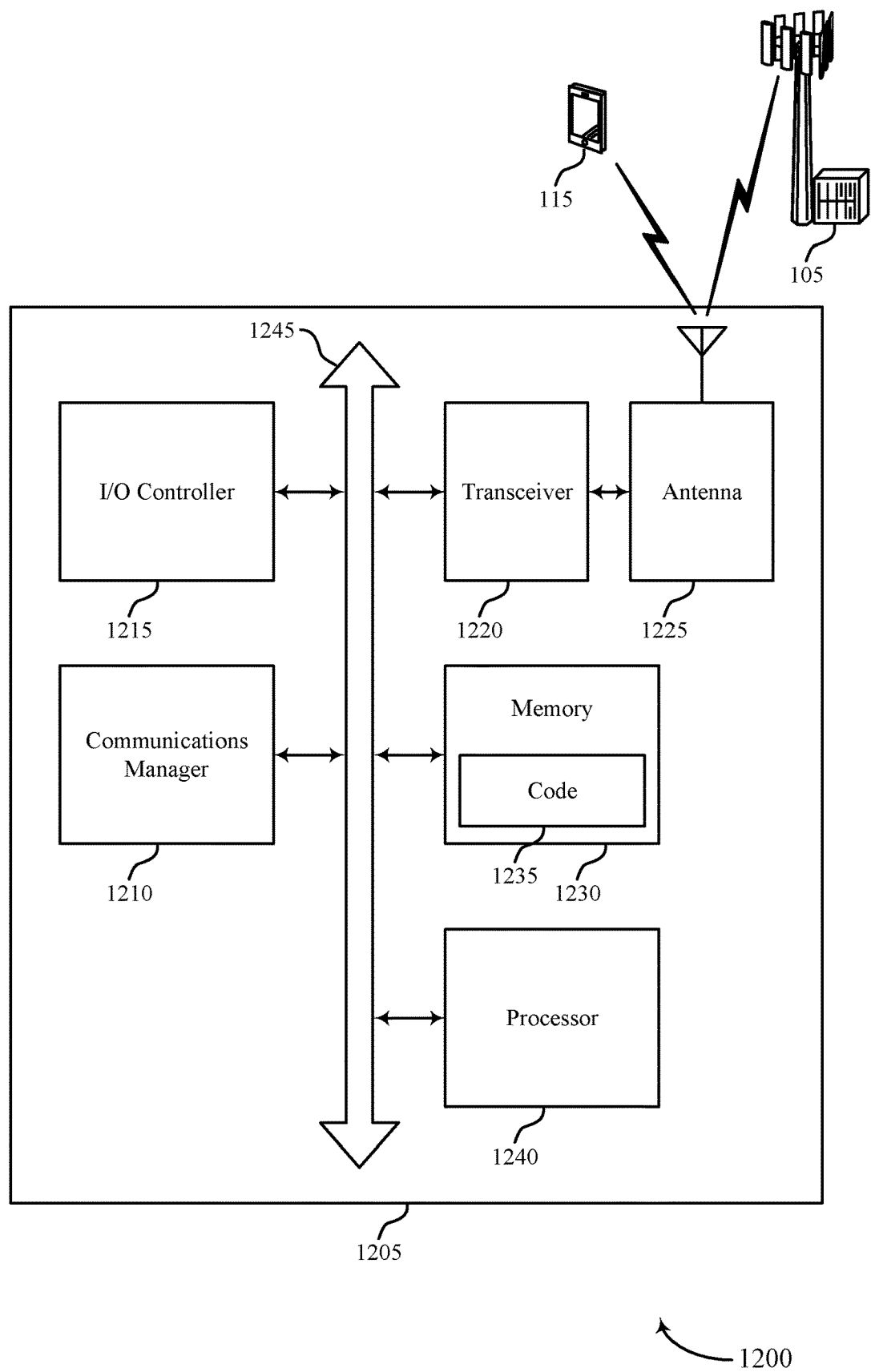
FIG. 12 shows a diagram of a system including a device that supports non-uniform DMRS bundling in accordance with aspects of the present disclosure.

FIG. 12 shows a diagram of a system 1200 including a device 1205 that supports non-uniform DMRS bundling in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive control signaling that schedules resources for receiving a set of DMRSs and a set of associated data channels across a set of TTIs, determine a reference signal bundling pattern for receiving the set of DMRSs and the set of associated data channels according to the control signaling, where the reference signal bundling pattern indicates that one or more of the set of TTIs are bundled as a set of reference signal bundled TTIs, at least two of the set of reference signal bundled TTIs having different durations, receive the set of DMRSs and the associated data channels according to the reference signal bundling pattern, and perform channel estimation based on the received set of DMRSs and the associated data channels.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting non-uniform DMRS bundling).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
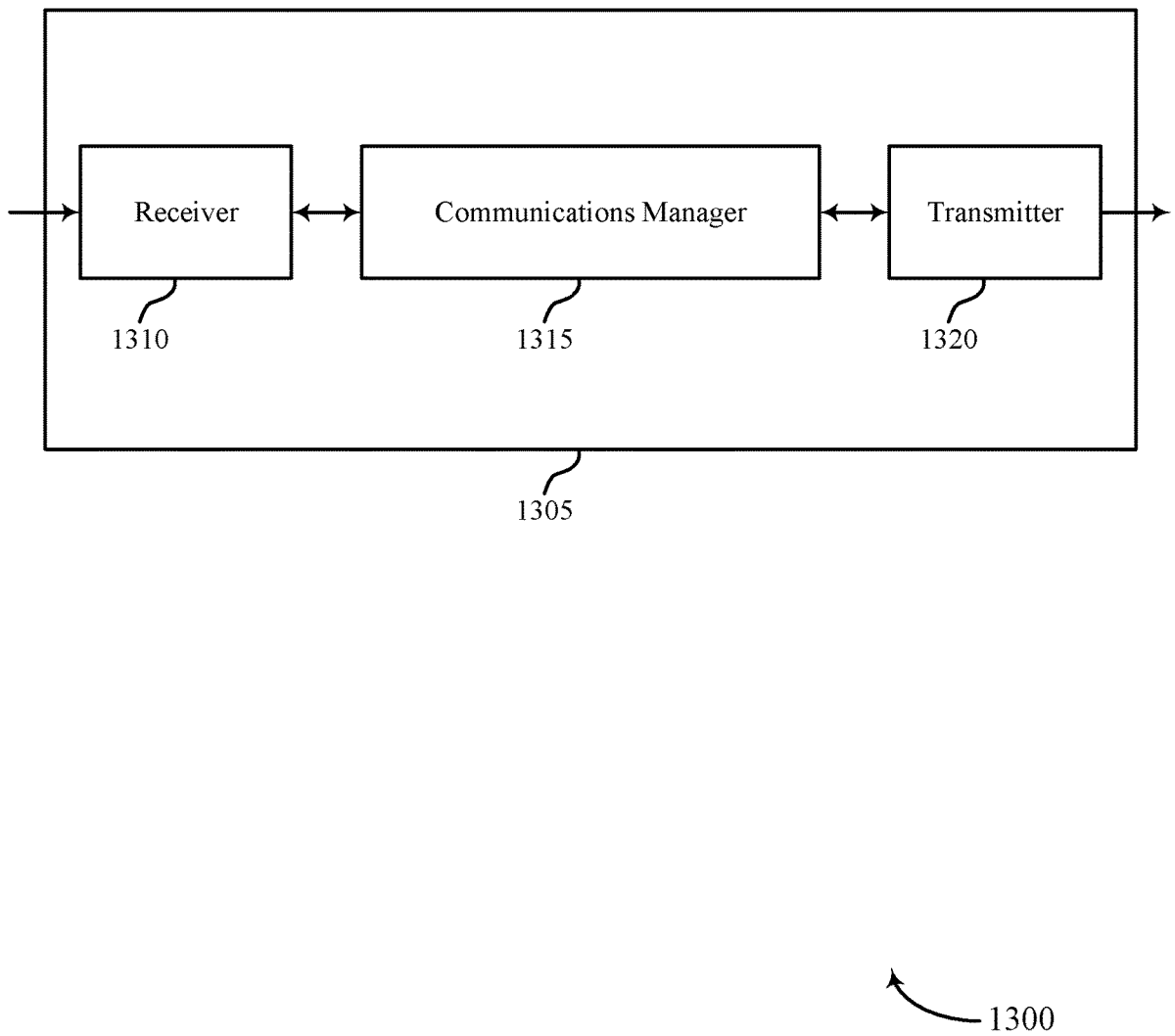
FIGS. 13 and 14 show block diagrams of devices that support non-uniform DMRS bundling in accordance with aspects of the present disclosure.

FIG. 13 shows a block diagram 1300 of a device 1305 that supports non-uniform DMRS bundling in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to non-uniform DMRS bundling, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may determine a reference signal bundling pattern for transmitting a set of DMRSs and a set of associated data channels across a set of TTIs, where the reference signal bundling pattern indicates that one or more of the set of TTIs are bundled as a set of reference signal bundled TTIs, at least two of the set of reference signal bundled TTIs having different durations, transmit control signaling indicating the reference signal bundling pattern that schedules resources for transmitting the set of DMRSs and the set of associated data channels across the set of TTIs, and transmit the set of DMRSs and the associated data channels according to the reference signal bundling pattern. The communications manager 1315 may be an example of aspects of the communications manager 1610 described herein. The actions performed by the communications manager 1315 as described herein may be implemented to realize one or more potential advantages discussed herein. One implementation may allow the device 1305 to transmit a bundling configuration to a UE, where the bundling configuration may configure parameters (e.g., a precoding setting) for communicating DMRSs according to one or more non-uniform bundles of TTIs (i.e., different bundles of the configuration may include different numbers of TTIs, and the different bundles may be configured accordingly). In this way, the device 1305 may more efficiently configure resources for a particular situation. For example, the bundling configuration may configure bundles near a first SRS transmission to be relatively shorter, and configure bundles that are later in the sequence to be relatively longer. By bundling a greater number of these TTIs, the device 1305 may conserve power and spectral resources by way of fewer transmissions.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
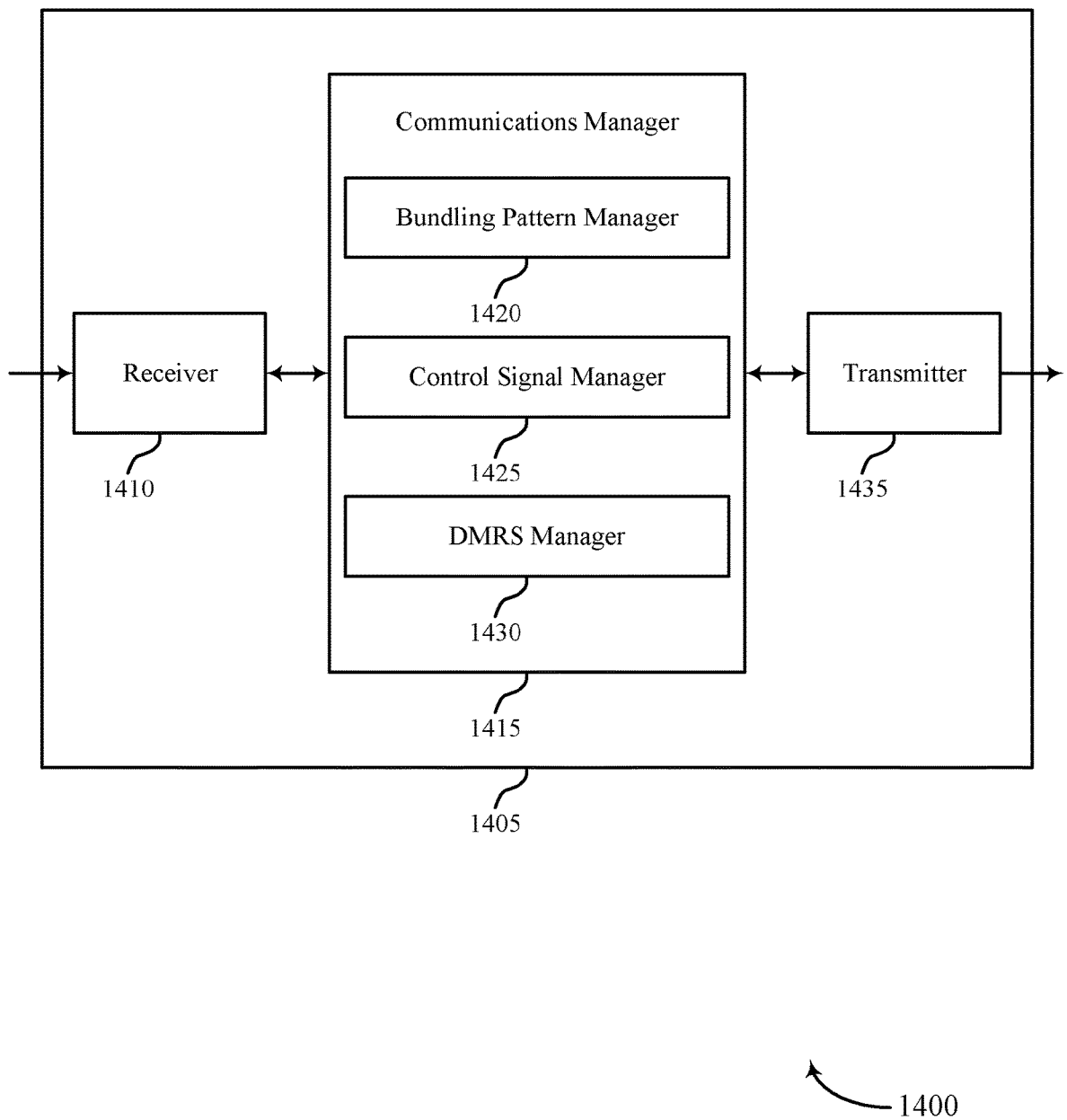

FIG. 14 shows a block diagram 1400 of a device 1405 that supports non-uniform DMRS bundling in accordance with aspects of the present disclosure. The device 1405 may be an example of aspects of a device 1305, or a base station 105 as described herein. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to non-uniform DMRS bundling, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a bundling pattern manager 1420, a control signal manager 1425, and a DMRS manager 1430. The communications manager 1415 may be an example of aspects of the communications manager 1610 described herein.

The bundling pattern manager 1420 may determine a reference signal bundling pattern for transmitting a set of DMRSs and a set of associated data channels across a set of TTIs, where the reference signal bundling pattern indicates that one or more of the set of TTIs are bundled as a set of reference signal bundled TTIs, at least two of the set of reference signal bundled TTIs having different durations.

The control signal manager 1425 may transmit control signaling indicating the reference signal bundling pattern that schedules resources for transmitting the set of DMRSs and the set of associated data channels across the set of TTIs.

The DMRS manager 1430 may transmit the set of DMRSs and the associated data channels according to the reference signal bundling pattern.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
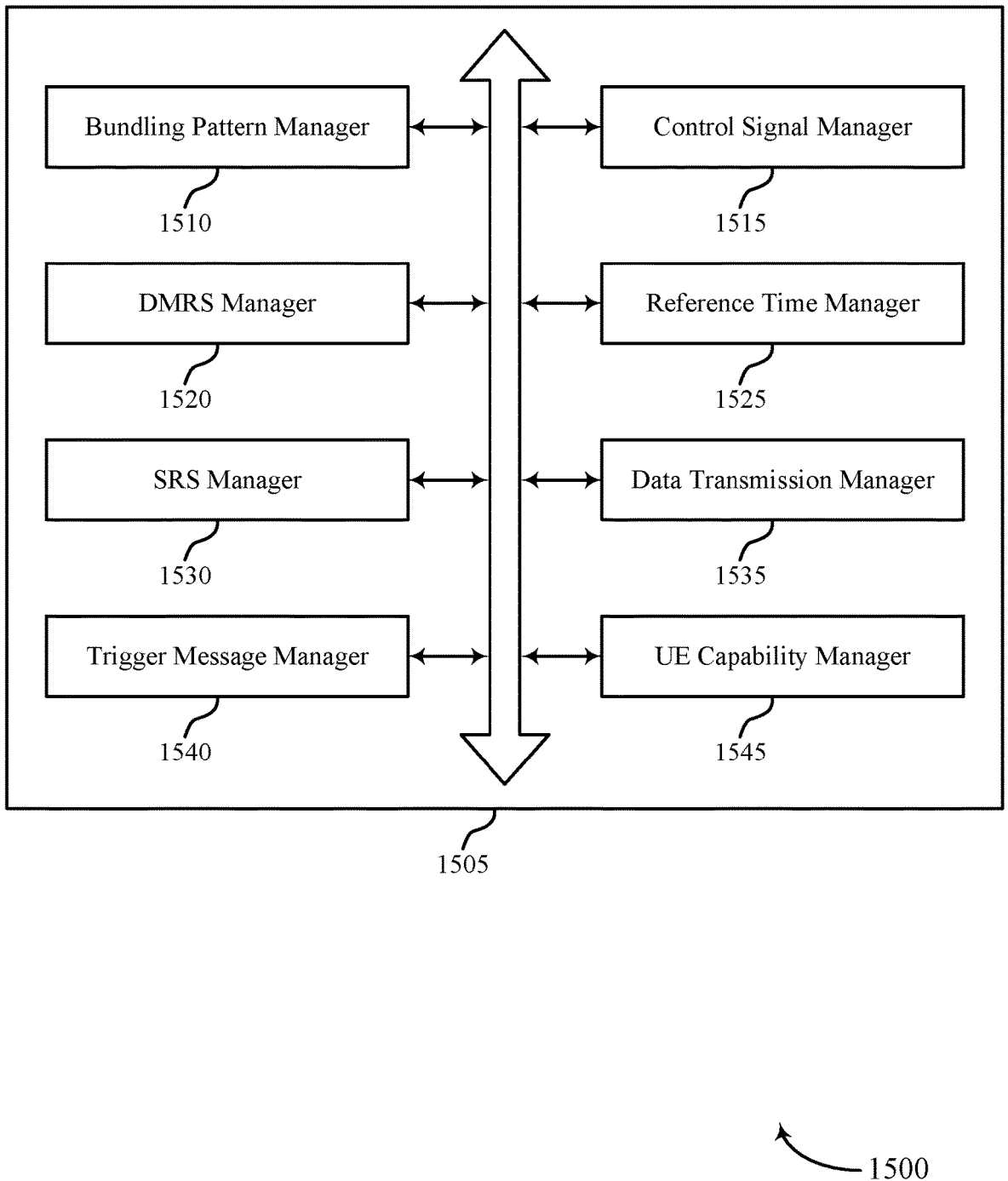
FIG. 15 shows a block diagram of a communications manager that supports non-uniform DMRS bundling in accordance with aspects of the present disclosure.

FIG. 15 shows a block diagram 1500 of a communications manager 1505 that supports non-uniform DMRS bundling in accordance with aspects of the present disclosure. The communications manager 1505 may be an example of aspects of a communications manager 1315, a communications manager 1415, or a communications manager 1610 described herein. The communications manager 1505 may include a bundling pattern manager 1510, a control signal manager 1515, a DMRS manager 1520, a reference time manager 1525, a SRS manager 1530, a data transmission manager 1535, a trigger message manager 1540, and a UE capability manager 1545. Each of these modules may communicate, directly or indirectly, with one another (e.g., via one or more buses).

The bundling pattern manager 1510 may determine a reference signal bundling pattern for transmitting a set of DMRSs and a set of associated data channels across a set of TTIs, where the reference signal bundling pattern indicates that one or more of the set of TTIs are bundled as a set of reference signal bundled TTIs, at least two of the set of reference signal bundled TTIs having different durations. In some cases, the reference signal bundling pattern indicates that the base station is to apply a same precoder for each bundled TTI of the set of reference signal bundled TTIs.

In some cases, the reference signal bundling pattern is based on a type of wireless communications system including the base station. In some cases, the type of wireless communications system is one or more of eMBB or URLLC. In some cases, the reference signal bundling pattern is based on a channel type in which the set of DMRSs are transmitted. In some cases, the channel type includes one of a first type of PDSCH or a second type of PDSCH, and where the first type of PDSCH is associated with transmitting an initial DMRS of the set of DMRSs based on a starting time of a set of one or more TTIs, and the second type of PDSCH is associated with transmitting the initial DMRS based on a starting time of an allocation for the scheduled resources.

The control signal manager 1515 may transmit control signaling indicating the reference signal bundling pattern that schedules resources for transmitting the set of DMRSs and the set of associated data channels across the set of TTIs.

The DMRS manager 1520 may transmit the set of DMRSs and the associated data channels according to the reference signal bundling pattern.

The reference time manager 1525 may determine a reference time at which to transmit an initial DMRS of the set of DMRSs during one of the set of reference signal bundled TTIs according to the reference signal bundling pattern. In some cases, the reference time is determined based on a boundary of a set of one or more TTIs of the set of TTIs. In some cases, the boundary of the set of one or more TTIs includes a frame boundary.

In some examples, the reference time manager 1525 may transmit an indication of an offset, where a duration of the offset begins following a latest SRS, and the reference time is determined to be a time at an end of the duration of the offset and within the second TTI. In some examples, the reference time manager 1525 may transmit an indication of an offset, where a duration of the offset begins at a beginning of the second TTI, and the reference time is determined to be a time at an end of the duration of the offset and within the second TTI.

The SRS manager 1530 may receive a SRS during a first TTI, where the reference time is determined to be within a second TTI, the second TTI following the first TTI. In some examples, the SRS manager 1530 may perform a channel measurement based on the SRS, where the SRS is associated with an antenna switching procedure (e.g., a use case of antenna switching). In some cases, the first TTI immediately follows the second TTI, and the first TTI includes a latest transmission of the SRS.

In some examples, the SRS manager 1530 may receive a SRS. In some examples, the SRS manager 1530 may determine that the SRS was not successfully received, where the reference signal bundling pattern is based on determining that the SRS was not successfully received.

In some examples, the SRS manager 1530 may receive a SRS on a set of PRBs, each of the PRBs including corresponding ones of the set of associated data channels, where the reference signal bundling pattern applies to the PRBs of the associated data channel corresponding to the set of PRBs, and not to PRBs of the associated data channel not corresponding to the set of PRBs.

The data transmission manager 1535 may transmit an initial data transmission after transmitting the SRS, where the reference time is determined to be a time following the initial data transmission. In some cases, the initial data transmission is transmitted in a PDSCH.

The trigger message manager 1540 may transmit a trigger message in a PDSCH after transmitting the SRS, and the reference signal bundling pattern is determined according to the first reference signal bundling pattern configuration or the second reference signal bundling pattern configuration based on the trigger message.

In some examples, the trigger message manager 1540 may transmit a trigger message, where the reference time is based on the trigger message. In some cases, the trigger message is transmitted in control information (e.g., DCI) in the PDSCH. In some cases, the trigger message further includes an offset, and the reference time is at a time following the offset. In some cases, the trigger message is transmitted in a MAC CE. In some cases, the actions performed by the trigger message manager 1540, included in the communications manager 1505, as described herein may facilitate the processor 1640, as described with reference to FIG. 16, to more efficiently cause the device to perform various functions. For example, the device may signal multiple bundling configurations to a UE, and the device may signal to the device in the trigger message which of the bundling configurations that the device is to apply. In such cases, the device may signal to the UE to apply a bundling configuration that may be better suited for the particular situation. In this way, the device may better utilize computational resources of the processor. Additionally or alternatively, as described herein, a first bundling sequence may be associated to a particular allocation over a second bundling sequence for situations in which the preferred bundling sequence may be implicit. Such an implicit association may reduce processing complexity for the processor of the device, and, by eliminating at least one unneeded transmission, may reduce processing power consumption for the processor of the device.

The UE capability manager 1545 may receive a capability message indicating a capability of a UE to support the reference signal bundling pattern for the set of DMRSs.

Figure 16:
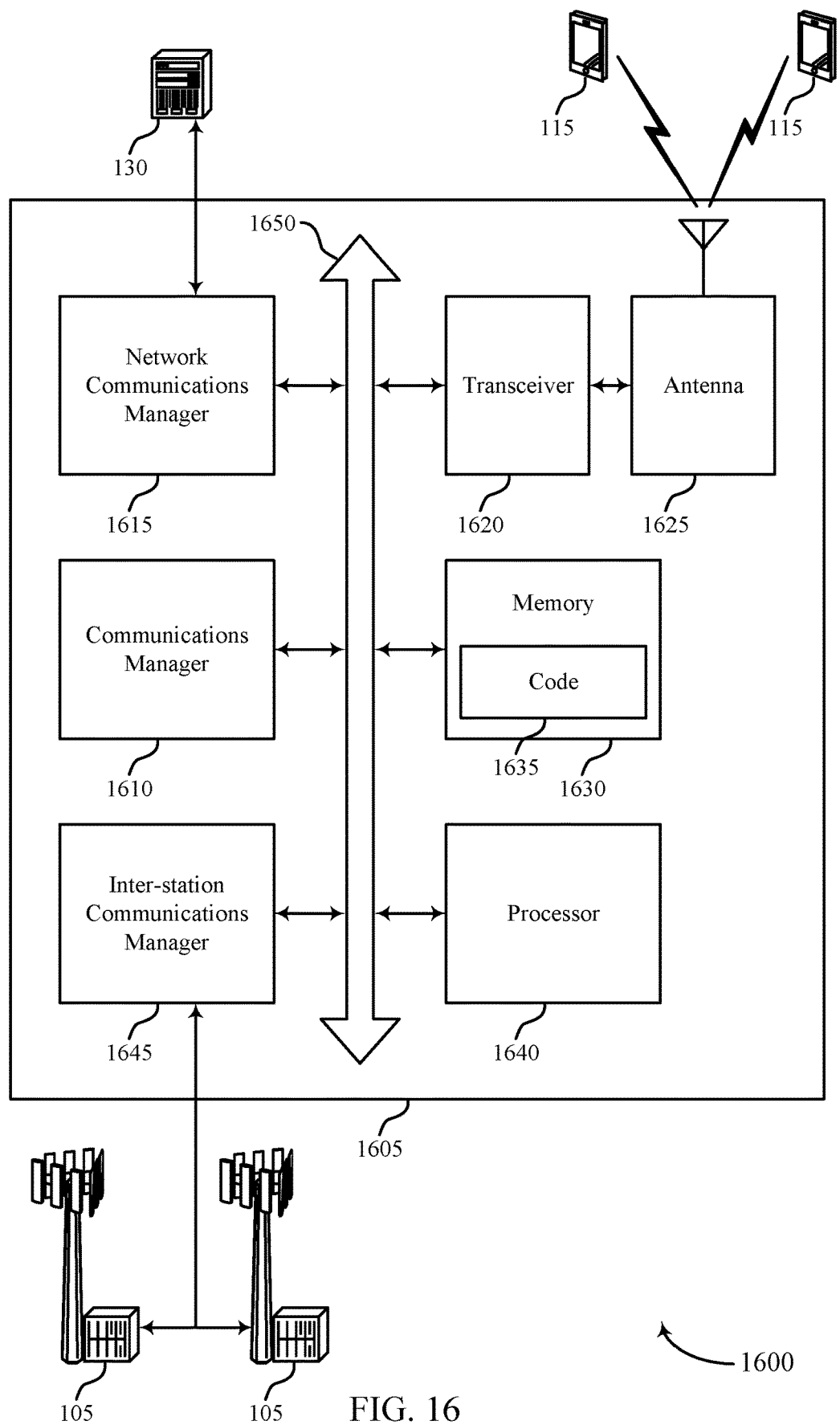
FIG. 16 shows a diagram of a system including a device that supports non-uniform DMRS bundling in accordance with aspects of the present disclosure.

FIG. 16 shows a diagram of a system 1600 including a device 1605 that supports non-uniform DMRS bundling in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may determine a reference signal bundling pattern for transmitting a set of DMRSs and a set of associated data channels across a set of TTIs, where the reference signal bundling pattern indicates that one or more of the set of TTIs are bundled as a set of reference signal bundled TTIs, at least two of the set of reference signal bundled TTIs having different durations, transmit control signaling indicating the reference signal bundling pattern that schedules resources for transmitting the set of DMRSs and the set of associated data channels across the set of TTIs, and transmit the set of DMRSs and the associated data channels according to the reference signal bundling pattern.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting non-uniform DMRS bundling).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
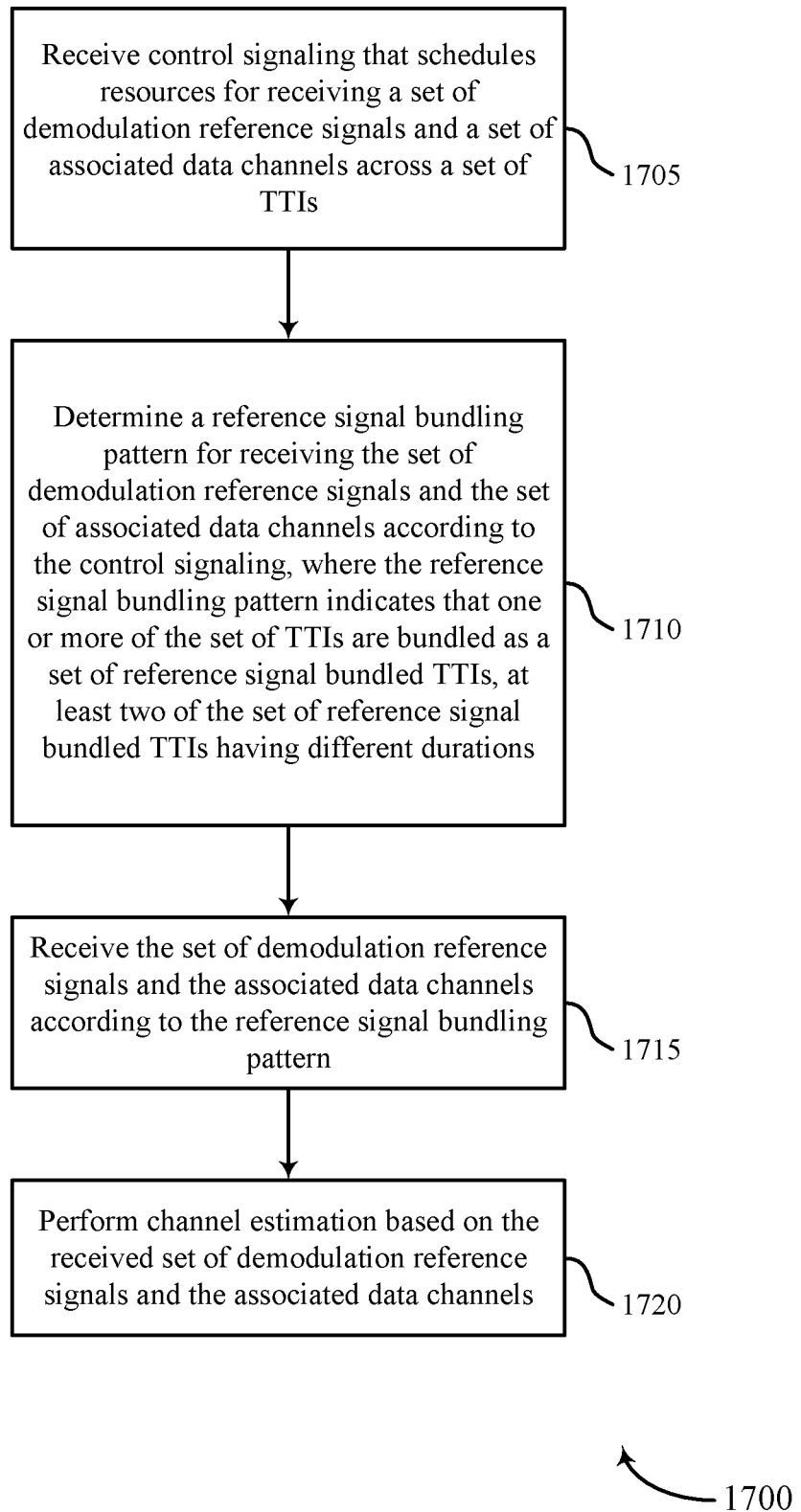
FIGS. 17 through 21 show flowcharts illustrating methods that support non-uniform DMRS bundling in accordance with aspects of the present disclosure.

FIG. 17 shows a flowchart illustrating a method 1700 that supports non-uniform DMRS bundling in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may receive control signaling that schedules resources for receiving a set of DMRSs and a set of associated data channels across a set of TTIs. The operations of 1705 may be performed according to the methods described herein. In some examples, aspects of the operations of 1705 may be performed by a control signal module as described with reference to FIGS. 9 through 12.

At 1710, the UE may determine a reference signal bundling pattern for receiving the set of DMRSs and the set of associated data channels according to the control signaling, where the reference signal bundling pattern indicates that one or more of the set of TTIs are bundled as a set of reference signal bundled TTIs, at least two of the set of reference signal bundled TTIs having different durations. The operations of 1710 may be performed according to the methods described herein. In some examples, aspects of the operations of 1710 may be performed by a bundling pattern module as described with reference to FIGS. 9 through 12.

At 1715, the UE may receive the set of DMRSs and the associated data channels according to the reference signal bundling pattern. The operations of 1715 may be performed according to the methods described herein. In some examples, aspects of the operations of 1715 may be performed by a DMRS module as described with reference to FIGS. 9 through 12.

At 1720, the UE may perform channel estimation based on the received set of DMRSs and the associated data channels. The operations of 1720 may be performed according to the methods described herein. In some examples, aspects of the operations of 1720 may be performed by a channel estimation module as described with reference to FIGS. 9 through 12.

Figure 18:
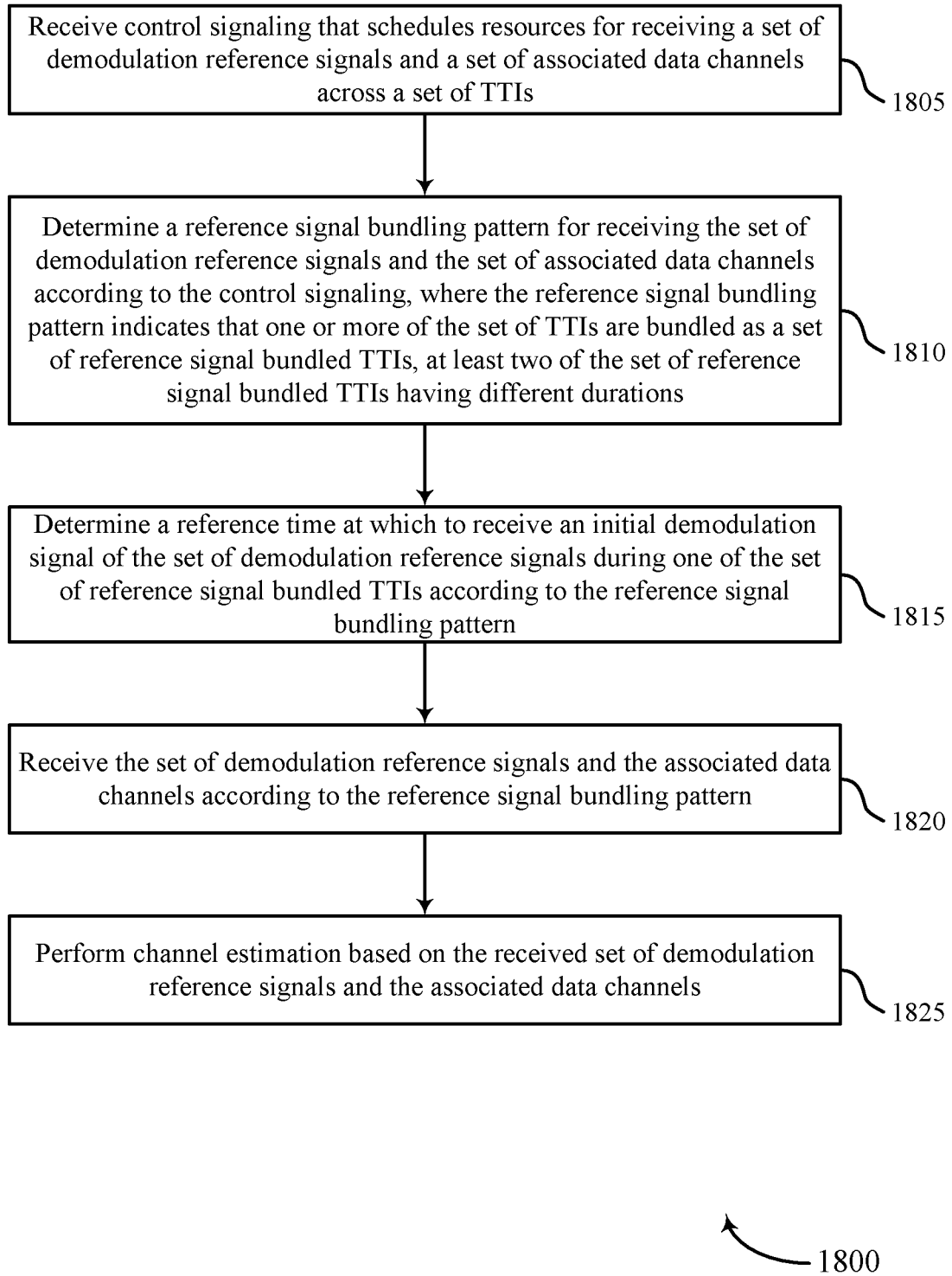

FIG. 18 shows a flowchart illustrating a method 1800 that supports non-uniform DMRS bundling in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may receive control signaling that schedules resources for receiving a set of DMRSs and a set of associated data channels across a set of TTIs. The operations of 1805 may be performed according to the methods described herein. In some examples, aspects of the operations of 1805 may be performed by a control signal module as described with reference to FIGS. 9 through 12.

At 1810, the UE may determine a reference signal bundling pattern for receiving the set of DMRSs and the set of associated data channels according to the control signaling, where the reference signal bundling pattern indicates that one or more of the set of TTIs are bundled as a set of reference signal bundled TTIs, at least two of the set of reference signal bundled TTIs having different durations. The operations of 1810 may be performed according to the methods described herein. In some examples, aspects of the operations of 1810 may be performed by a bundling pattern module as described with reference to FIGS. 9 through 12.

At 1815, the UE may determine a reference time at which to receive an initial DMRS of the set of DMRSs during one of the set of reference signal bundled TTIs according to the reference signal bundling pattern. The operations of 1815 may be performed according to the methods described herein. In some examples, aspects of the operations of 1815 may be performed by a reference time module as described with reference to FIGS. 9 through 12.

At 1820, the UE may receive the set of DMRSs and the associated data channels according to the reference signal bundling pattern. The operations of 1820 may be performed according to the methods described herein. In some examples, aspects of the operations of 1820 may be performed by a DMRS module as described with reference to FIGS. 9 through 12.

At 1825, the UE may perform channel estimation based on the received set of DMRSs and the associated data channels. The operations of 1825 may be performed according to the methods described herein. In some examples, aspects of the operations of 1825 may be performed by a channel estimation module as described with reference to FIGS. 9 through 12.

Figure 19:
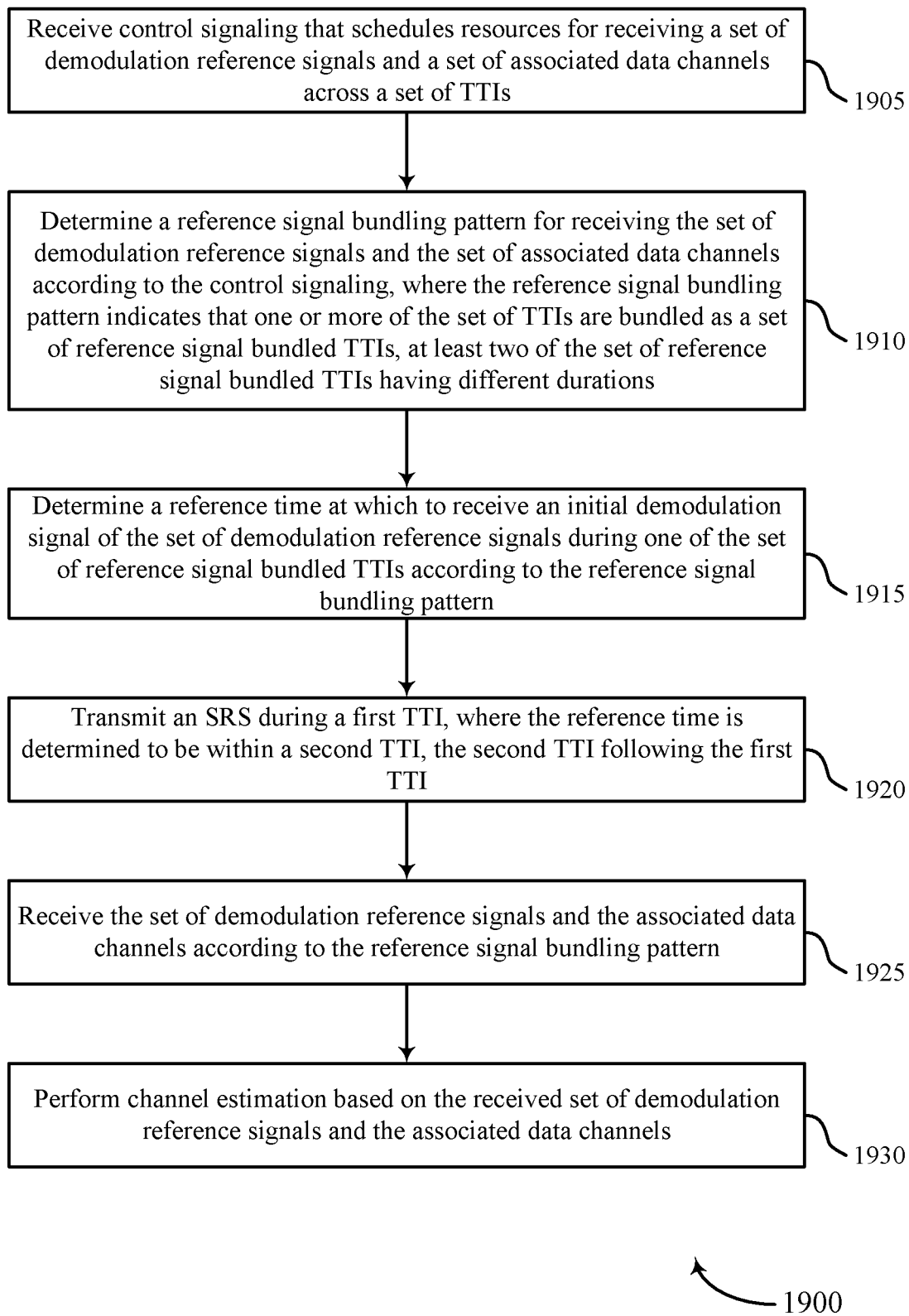

FIG. 19 shows a flowchart illustrating a method 1900 that supports non-uniform DMRS bundling in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may receive control signaling that schedules resources for receiving a set of DMRSs and a set of associated data channels across a set of TTIs. The operations of 1905 may be performed according to the methods described herein. In some examples, aspects of the operations of 1905 may be performed by a control signal module as described with reference to FIGS. 9 through 12.

At 1910, the UE may determine a reference signal bundling pattern for receiving the set of DMRSs and the set of associated data channels according to the control signaling, where the reference signal bundling pattern indicates that one or more of the set of TTIs are bundled as a set of reference signal bundled TTIs, at least two of the set of reference signal bundled TTIs having different durations. The operations of 1910 may be performed according to the methods described herein. In some examples, aspects of the operations of 1910 may be performed by a bundling pattern module as described with reference to FIGS. 9 through 12.

At 1915, the UE may determine a reference time at which to receive an initial DMRS of the set of DMRSs during one of the set of reference signal bundled TTIs according to the reference signal bundling pattern. The operations of 1915 may be performed according to the methods described herein. In some examples, aspects of the operations of 1915 may be performed by a reference time module as described with reference to FIGS. 9 through 12.

At 1920, the UE may transmit a SRS during a first TTI, where the reference time is determined to be within a second TTI, the second TTI following the first TTI. The operations of 1920 may be performed according to the methods described herein. In some examples, aspects of the operations of 1920 may be performed by a SRS module as described with reference to FIGS. 9 through 12.

At 1925, the UE may receive the set of DMRSs and the associated data channels according to the reference signal bundling pattern. The operations of 1925 may be performed according to the methods described herein. In some examples, aspects of the operations of 1925 may be performed by a DMRS module as described with reference to FIGS. 9 through 12.

At 1930, the UE may perform channel estimation based on the received set of DMRSs and the associated data channels. The operations of 1930 may be performed according to the methods described herein. In some examples, aspects of the operations of 1930 may be performed by a channel estimation module as described with reference to FIGS. 9 through 12.

Figure 20:
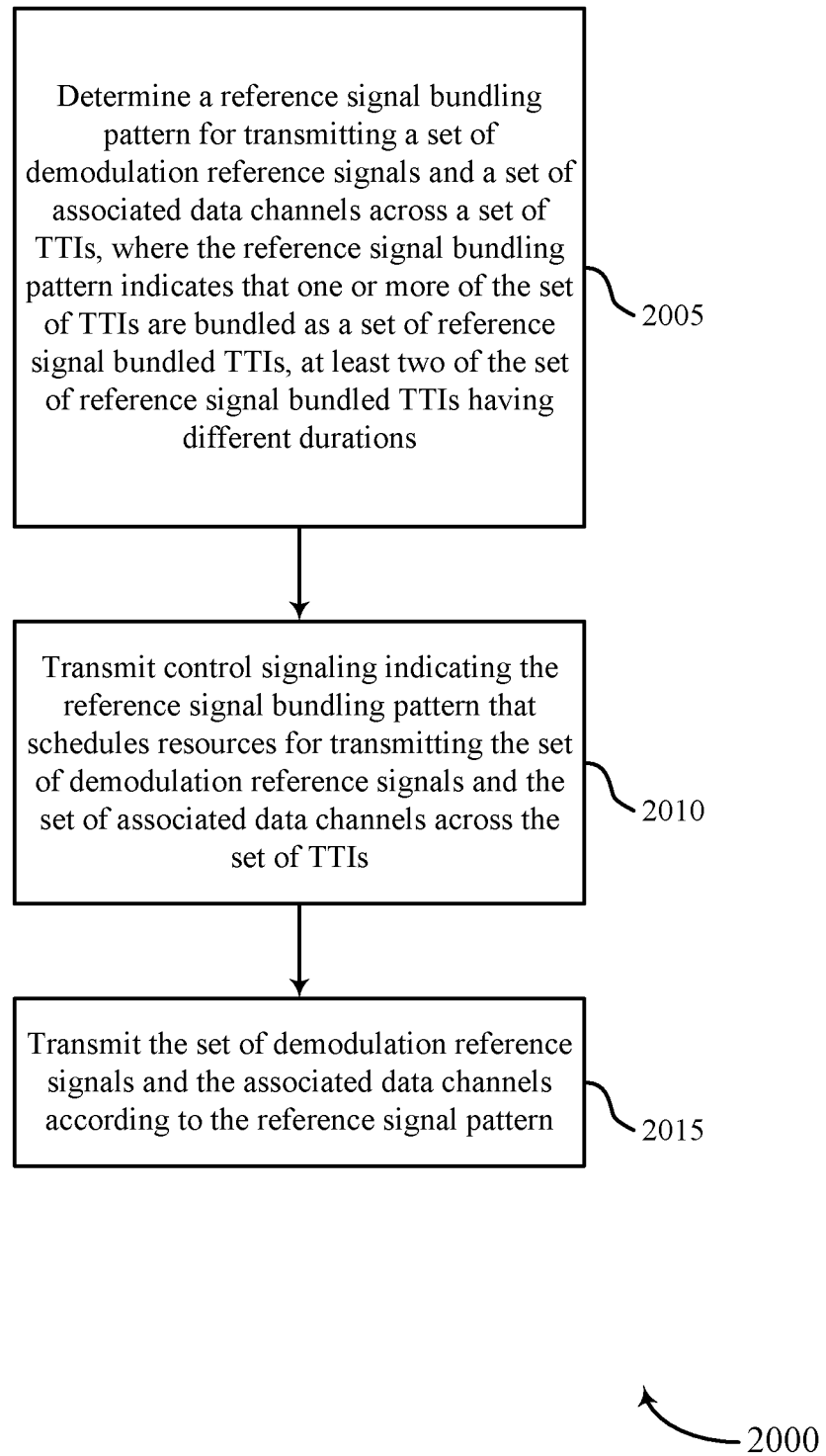

FIG. 20 shows a flowchart illustrating a method 2000 that supports non-uniform DMRS bundling in accordance with aspects of the present disclosure. The operations of method 2000 may be implemented by a base station 105 or its components as described herein. For example, the operations of method 2000 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2005, the base station may determine a reference signal bundling pattern for transmitting a set of DMRSs and a set of associated data channels across a set of TTIs, where the reference signal bundling pattern indicates that one or more of the set of TTIs are bundled as a set of reference signal bundled TTIs, at least two of the set of reference signal bundled TTIs having different durations. The operations of 2005 may be performed according to the methods described herein. In some examples, aspects of the operations of 2005 may be performed by a bundling pattern manager as described with reference to FIGS. 13 through 16.

At 2010, the base station may transmit control signaling indicating the reference signal bundling pattern that schedules resources for transmitting the set of DMRSs and the set of associated data channels across the set of TTIs. The operations of 2010 may be performed according to the methods described herein. In some examples, aspects of the operations of 2010 may be performed by a control signal manager as described with reference to FIGS. 13 through 16.

At 2015, the base station may transmit the set of DMRSs and the associated data channels according to the reference signal bundling pattern. The operations of 2015 may be performed according to the methods described herein. In some examples, aspects of the operations of 2015 may be performed by a DMRS manager as described with reference to FIGS. 13 through 16.

Figure 21:
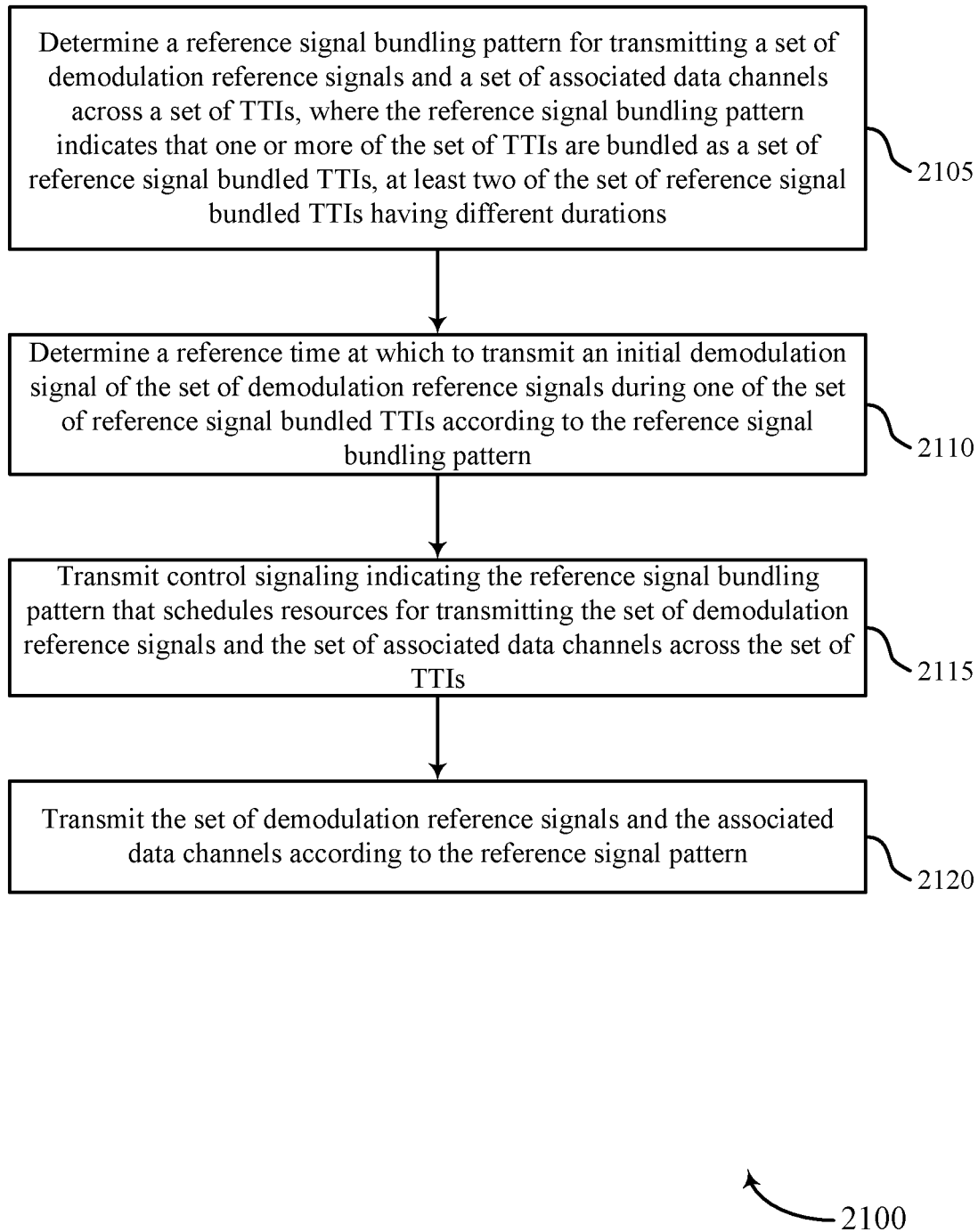

FIG. 21 shows a flowchart illustrating a method 2100 that supports non-uniform DMRS bundling in accordance with aspects of the present disclosure. The operations of method 2100 may be implemented by a base station 105 or its components as described herein. For example, the operations of method 2100 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2105, the base station may determine a reference signal bundling pattern for transmitting a set of DMRSs and a set of associated data channels across a set of TTIs, where the reference signal bundling pattern indicates that one or more of the set of TTIs are bundled as a set of reference signal bundled TTIs, at least two of the set of reference signal bundled TTIs having different durations. The operations of 2105 may be performed according to the methods described herein. In some examples, aspects of the operations of 2105 may be performed by a bundling pattern manager as described with reference to FIGS. 13 through 16.

At 2110, the base station may determine a reference time at which to transmit an initial DMRS of the set of DMRSs during one of the set of reference signal bundled TTIs according to the reference signal bundling pattern. The operations of 2110 may be performed according to the methods described herein. In some examples, aspects of the operations of 2110 may be performed by a reference time manager as described with reference to FIGS. 13 through 16.

At 2115, the base station may transmit control signaling indicating the reference signal bundling pattern that schedules resources for transmitting the set of DMRSs and the set of associated data channels across the set of TTIs. The operations of 2115 may be performed according to the methods described herein. In some examples, aspects of the operations of 2115 may be performed by a control signal manager as described with reference to FIGS. 13 through 16.

At 2120, the base station may transmit the set of DMRSs and the associated data channels according to the reference signal bundling pattern. The operations of 2120 may be performed according to the methods described herein. In some examples, aspects of the operations of 2120 may be performed by a DMRS manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving control signaling that schedules resources for receiving a plurality of demodulation reference signals and a plurality of associated data channels across a plurality of transmission time intervals (TTIs);
    determining a reference signal bundling pattern for receiving the plurality of demodulation reference signals and the plurality of associated data channels according to the control signaling, wherein the reference signal bundling pattern indicates that one or more of the plurality of TTIs are bundled as a plurality of reference signal bundled TTIs, at least two of the plurality of reference signal bundled TTIs having different durations;
    receiving the plurality of demodulation reference signals and the plurality of associated data channels according to the reference signal bundling pattern; and
    performing channel estimation based at least in part on the received plurality of demodulation reference signals and the plurality of associated data channels.

2. The method of claim 1, further comprising:
    demodulating the plurality of associated data channels based at least in part on performing the channel estimation using the received plurality of demodulation reference signals.

3. The method of claim 1, further comprising:
    determining a reference time at which to receive an initial demodulation reference signal of the plurality of demodulation reference signals during one of the plurality of reference signal bundled TTIs according to the reference signal bundling pattern.

4. The method of claim 3, further comprising:
    transmitting a sounding reference signal (SRS) during a first TTI, wherein the reference time is determined to be within a second TTI, the second TTI following the first TTI.

5. The method of claim 4, wherein the first TTI immediately follows the second TTI, and the first TTI comprises a latest transmission of the SRS.

6. The method of claim 4, wherein the SRS is associated with a use case of antenna switching.

7. The method of claim 4, further comprising:
    receiving an indication of an offset, wherein a duration of the offset begins following a latest SRS, and the reference time is determined to be a time at an end of the duration of the offset and within the second TTI.

8. The method of claim 4, further comprising:
    receiving an indication of an offset, wherein a duration of the offset begins at a beginning of the second TTI, and the reference time is determined to be a time at an end of the duration of the offset and within the second TTI.

9. The method of claim 4, further comprising:
    receiving an initial data transmission after transmitting the SRS, wherein the reference time is determined to be a time following the initial data transmission.

10. The method of claim 9, wherein the initial data transmission is received in a physical downlink shared channel (PDSCH).

11. The method of claim 4, wherein the control signaling comprises a first reference signal bundling pattern configuration and a second reference signal bundling pattern configuration, the method further comprising:
    receiving a trigger message in a physical downlink shared channel (PDSCH) after transmitting the SRS, and the reference signal bundling pattern is determined according to the first reference signal bundling pattern configuration or the second reference signal bundling pattern configuration based at least in part on the trigger message.

12. The method of claim 11, wherein the trigger message is received in downlink control information in the PDSCH.

13. The method of claim 3, wherein the reference time is determined based at least in part on a boundary of a set of one or more TTIs of the plurality of TTIs, and wherein the boundary of the set of one or more TTIs comprises a frame boundary.

14. The method of claim 3, further comprising:
    receiving a trigger message, wherein the reference time is determined based at least in part on the trigger message.

15. The method of claim 14, wherein the trigger message further comprises an offset, and the reference time is at a time following the offset, and wherein the trigger message is received in a medium access control (MAC) control element (CE).

16. The method of claim 1, wherein the reference signal bundling pattern indicates that the UE is to assume a same precoding for receiving transmissions in each bundled TTI of the plurality of reference signal bundled TTIs.

17. The method of claim 1, further comprising:
    transmitting a capability message indicating a capability of the UE to support the reference signal bundling pattern for receiving the plurality of demodulation reference signals.

18. The method of claim 1, wherein the reference signal bundling pattern is based at least in part on a type of wireless communications system comprising the UE.

19. The method of claim 18, wherein the type of wireless communications system is one or more of enhanced mobile broadband or ultra-reliable, low latency communications.

20. The method of claim 1, wherein the reference signal bundling pattern is based at least in part on a channel type in which the plurality of demodulation reference signals are received.

21. The method of claim 20, wherein the channel type comprises one of a first type of physical downlink share channel (PDSCH) or a second type of PDSCH, and wherein the first type of PDSCH is associated with receiving an initial demodulation reference signal of the plurality of demodulation reference signals based at least in part on a starting time of a set of one or more TTIs, and the second type of PDSCH is associated with receiving the initial demodulation reference signal based at least in part on a starting time of an allocation for the scheduled resources.

22. The method of claim 1, further comprising:
transmitting a sounding reference signal (SRS); and
determining that the SRS was not successfully received, wherein the reference signal bundling pattern is based at least in part on determining that the SRS was not successfully received.

23. The method of claim 1, further comprising:
transmitting a sounding reference signal (SRS) on a first set of physical resource blocks (PRBs), each of the PRBs of the first set of PRBs corresponding to respective PRBs of a second set of PRBs of the plurality of associated data channels, wherein the reference signal bundling pattern applies to the second set of PRBs of the plurality of associated data channels corresponding to the first set of PRBs, and not to a third set of PRBs of the plurality of associated data channels not corresponding to the first set of PRBs.

24. The method of claim 1, wherein the plurality of reference signal bundled TTIs comprises a first reference signal bundled TTI and a second reference signal bundled TTI, the first reference signal bundled TTI comprising a first number of TTIs and the second reference signal bundled TTI comprising a second number of TTIs, and wherein the first number of TTIs is different from the second number of TTIs.

25. An apparatus for wireless communication at a user equipment (UE), comprising: a processor, memory coupled with the processor; and instructions stored in the memory and executable by the processor to cause the apparatus to:
receive control signaling that schedules resources for receiving a plurality of demodulation reference signals and a plurality of associated data channels across a plurality of transmission time intervals (TTIs);
determine a reference signal bundling pattern for receiving the plurality of demodulation reference signals and the plurality of associated data channels according to the control signaling, wherein the reference signal bundling pattern indicates that one or more of the plurality of TTIs are bundled as a plurality of reference signal bundled TTIs, at least two of the plurality of reference signal bundled TTIs having different durations;
receive the plurality of demodulation reference signals and the plurality of associated data channels according to the reference signal bundling pattern; and
perform channel estimation based at least in part on the received plurality of demodulation reference signals and the plurality of associated data channels.

26. The apparatus of claim 25, wherein the instructions are further executable by the processor to cause the apparatus to:
demodulate the plurality of associated data channels based at least in part on performing the channel estimation using the received plurality of demodulation reference signals.

27. The apparatus of claim 25, wherein the reference signal bundling pattern indicates that the UE is to assume a same precoding for receiving transmissions in each bundled TTI of the plurality of reference signal bundled TTIs.

28. The apparatus of claim 25, wherein the reference signal bundling pattern is based at least in part on a channel type in which the plurality of demodulation reference signals are received.

29. An apparatus for wireless communication at a user equipment (UE), comprising: means for receiving control signaling that schedules resources for receiving a plurality of demodulation reference signals and a plurality of associated data channels across a plurality of transmission time intervals (TTIs); means for determining a reference signal bundling pattern for receiving the plurality of demodulation reference signals and the plurality of associated data channels according to the control signaling, wherein the reference signal bundling pattern indicates that one or more of the plurality of TTIs are bundled as a plurality of reference signal bundled TTIs, at least two of the plurality of reference signal bundled TTIs having different durations; means for receiving the plurality of demodulation reference signals and the plurality of associated data channels according to the reference signal bundling pattern; and
means for performing channel estimation based at least in part on the received plurality of demodulation reference signals and the plurality of associated data channels.

30. A non-transitory computer-readable medium storing code for wireless communication at a user equipment (UE), the code comprising instructions executable by a processor to:
receive control signaling that schedules resources for receiving a plurality of demodulation reference signals and a plurality of associated data channels across a plurality of transmission time intervals (TTIs);
determine a reference signal bundling pattern for receiving the plurality of demodulation reference signals and the plurality of associated data channels according to the control signaling, wherein the reference signal bundling pattern indicates that one or more of the plurality of TTIs are bundled as a plurality of reference signal bundled TTIs, at least two of the plurality of reference signal bundled TTIs having different durations;
receive the plurality of demodulation reference signals and the plurality of associated data channels according to the reference signal bundling pattern; and
perform channel estimation based at least in part on the received plurality of demodulation reference signals and the plurality of associated data channels.

* * * * *